(12) United States Patent
Schlanger

(10) Patent No.: US 8,485,335 B2
(45) Date of Patent: Jul. 16, 2013

(54) TORQUE COUPLING ASSEMBLY

(76) Inventor: Raphael Schlanger, Wilton, CT (US)

( * ) Notice: Subject to any disclaimer, the term of this patent is extended or adjusted under 35 U.S.C. 154(b) by 684 days.

(21) Appl. No.: 12/655,433

(22) Filed: Dec. 30, 2009

(65) Prior Publication Data

US 2010/0170762 A1   Jul. 8, 2010

Related U.S. Application Data

(60) Provisional application No. 61/204,130, filed on Jan. 2, 2009.

(51) Int. Cl.
*F16D 41/26* (2006.01)
*B62K 25/00* (2006.01)
*B60B 35/02* (2006.01)
*B60B 27/02* (2006.01)

(52) U.S. Cl.
USPC .................... 192/64; 301/124.2; 301/110.5

(58) Field of Classification Search
USPC .............................. 192/64; 301/124.2, 110.5
See application file for complete search history.

(56) References Cited

U.S. PATENT DOCUMENTS

| | | | | |
|---|---|---|---|---|
| 5,823,555 A | * | 10/1998 | Ashman | 280/279 |
| 6,374,975 B1 | * | 4/2002 | Schlanger | 192/64 |
| 6,497,314 B2 | * | 12/2002 | Kanehisa | 192/64 |
| 6,523,659 B2 | * | 2/2003 | Kanehisa et al. | 192/64 |
| RE39,528 E | * | 3/2007 | Kanehisa et al. | 301/110.5 |
| 7,909,412 B2 | * | 3/2011 | Ashman | 301/110.5 |
| 7,926,886 B1 | * | 4/2011 | Ashman | 301/110.5 |

OTHER PUBLICATIONS

Cinelli bivalent hub article, 1995, Cinelli.

\* cited by examiner

*Primary Examiner* — David D Le
*Assistant Examiner* — Jacob S Scott

(57) ABSTRACT

A torque coupling assembly including: a driving assembly with a driving axle and a rotatable driving shell; a driven assembly with a driven axle and a rotatable driven shell; and a frame element. The driving and driven shells each include an axial projection. In an assembled position, the driving and driven assemblies are both connected to the frame and their respective axial projections are aligned to transmit rotational torque between the driving shell and the driven shell. In a removed position, one of the driving assembly and the driven assembly may be removed in a generally radial direction relative to the frame and the other of the driving assembly and the driven assembly. The driving and/or driven assembly may include ramped lead-in geometry. The driving and/or driven assembly may include shielding geometry to axially overlap at least a portion of the axial projection.

65 Claims, 19 Drawing Sheets

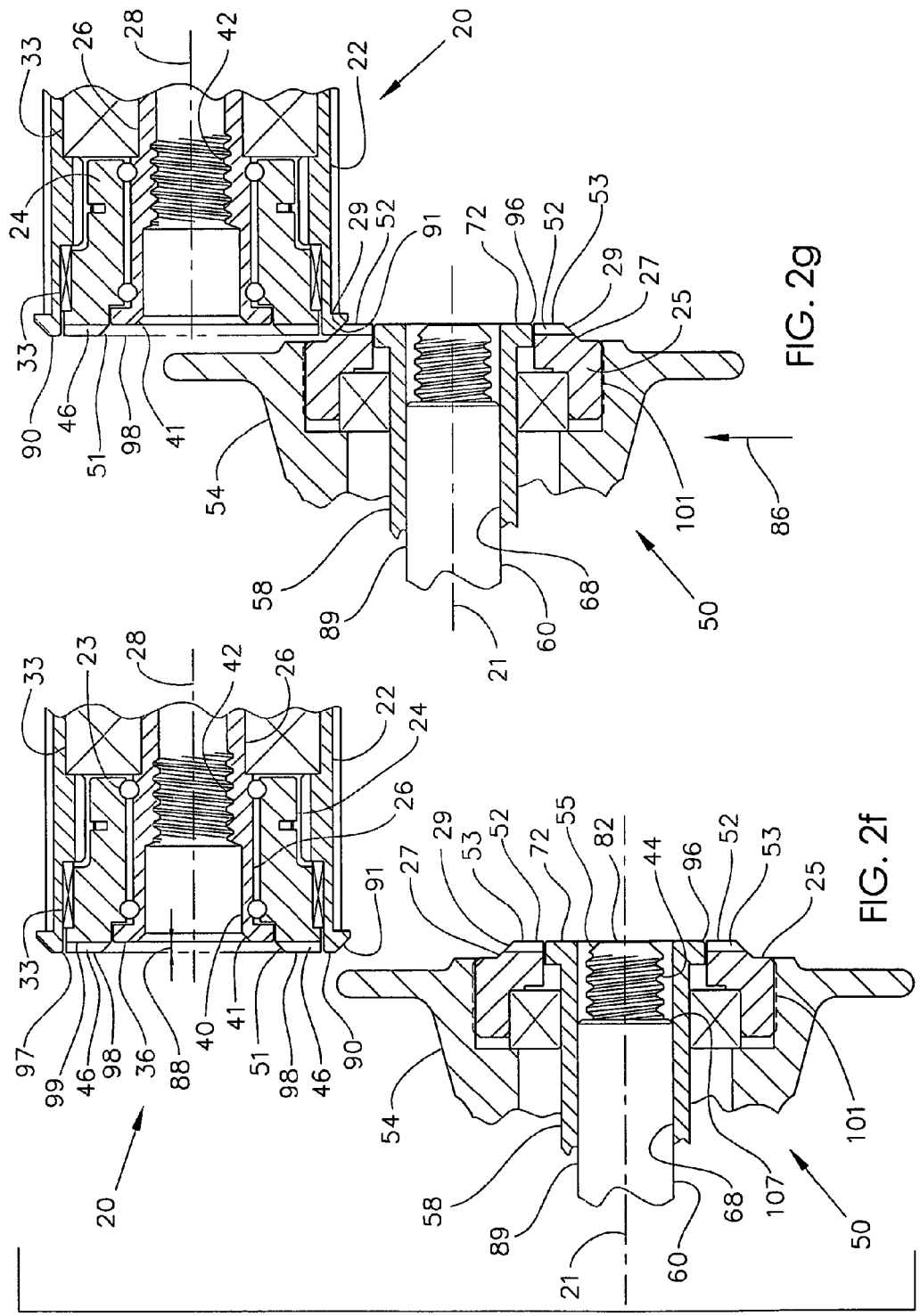

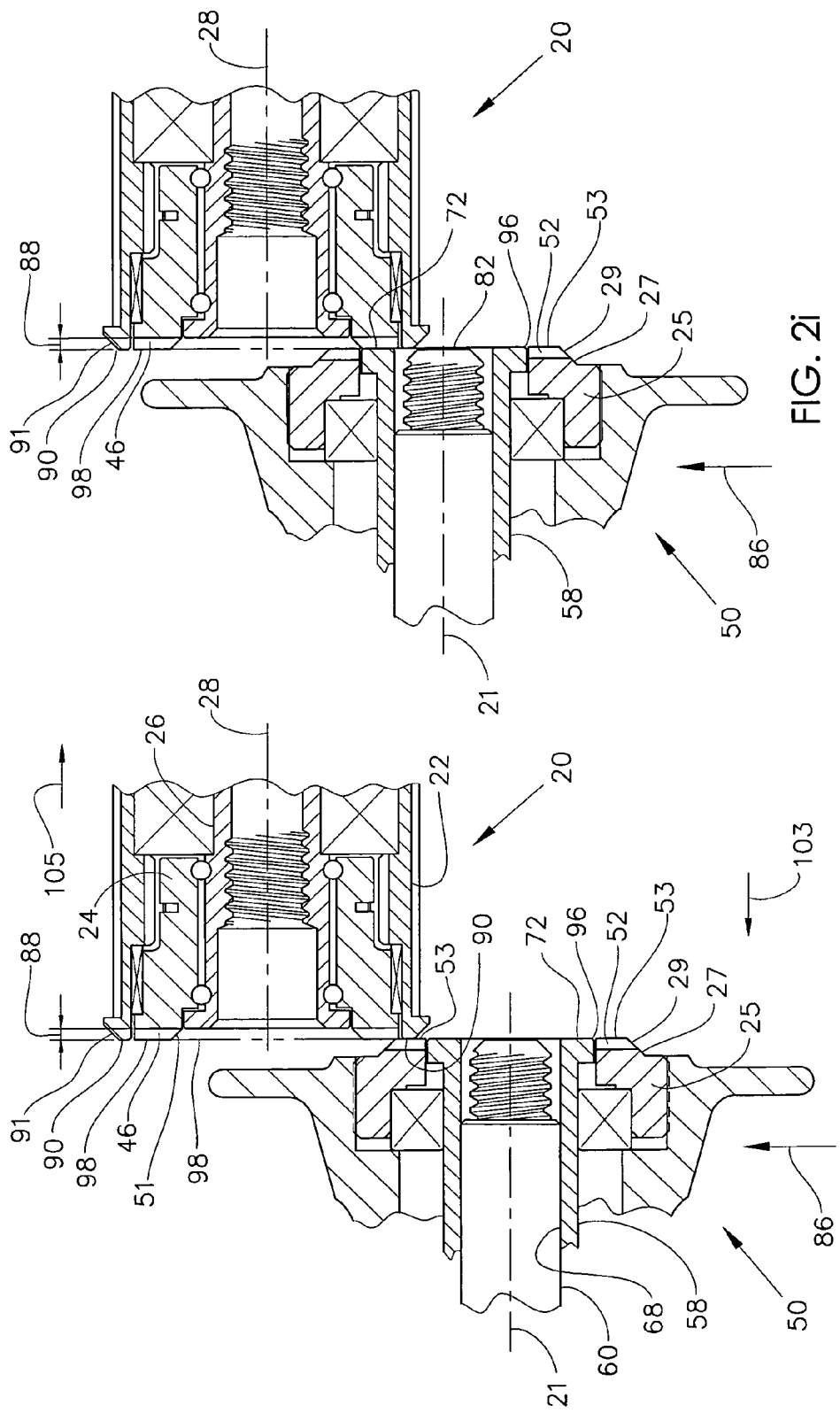

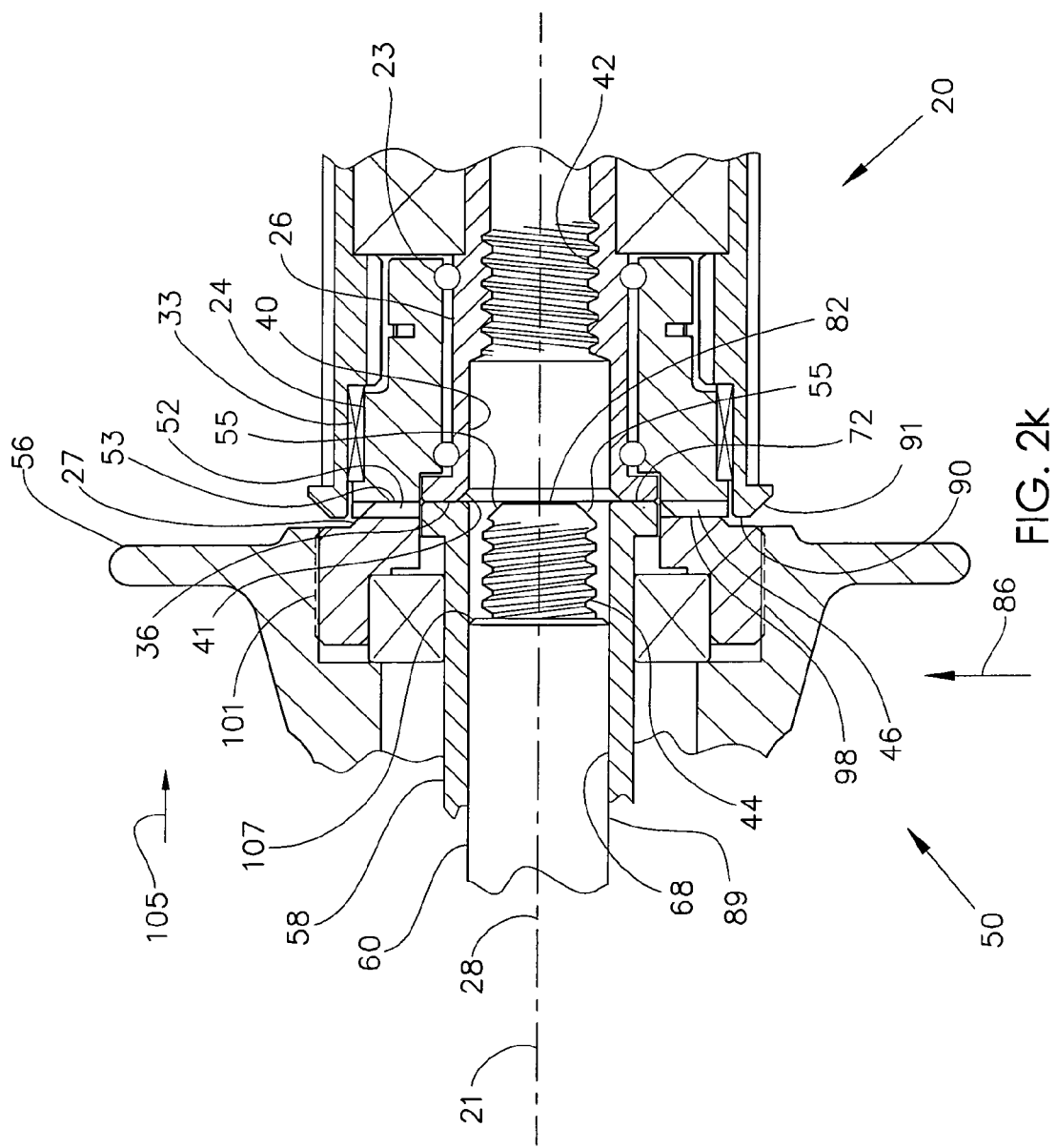

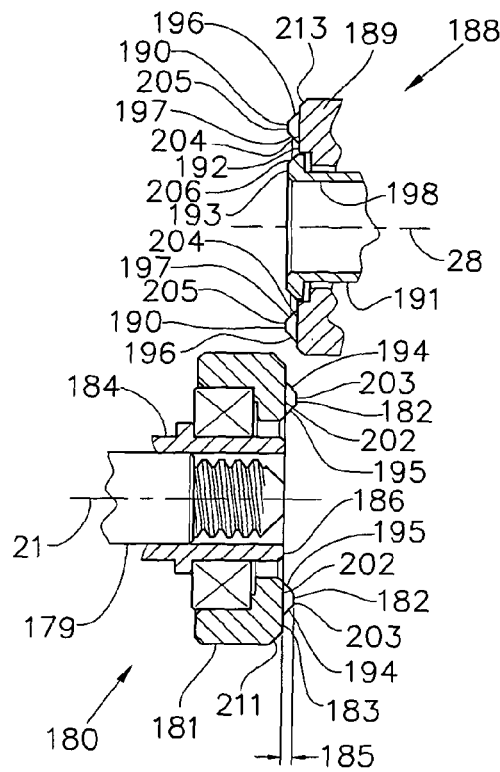

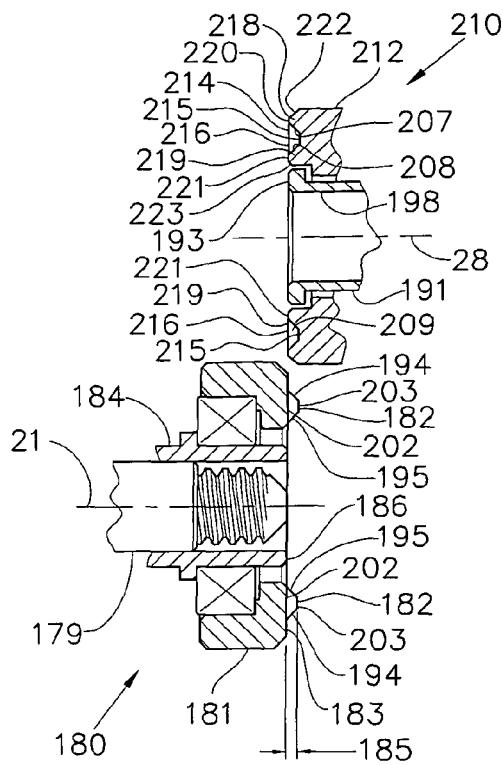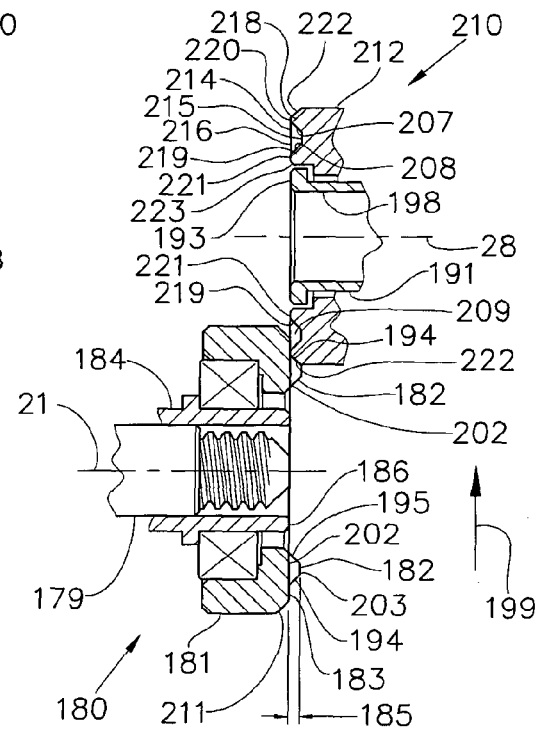
FIG. 10a
FIG. 10b
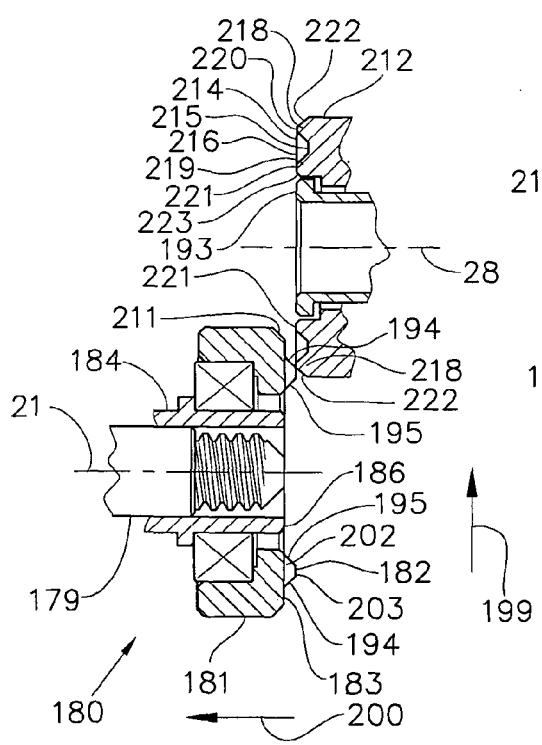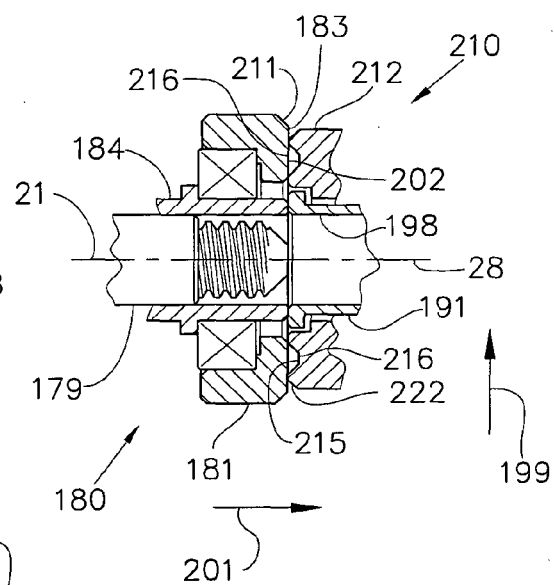
FIG. 10c
FIG. 10d

TORQUE COUPLING ASSEMBLY

CROSS-REFERENCE TO RELATED APPLICATION

This application claims priority of U.S. provisional patent application 61/204,130, filed Jan. 2, 2009, and entitled "TORQUE COUPLING ASSEMBLY".

BACKGROUND

1. Field of the Invention

The present invention relates to torque coupling arrangements between two axially adjacent rotatable assemblies that both rotate about a collinear axis and, as shown in the instant embodiments, the present invention also relates to the attachment of a vehicle wheel to its mount frame, more specifically the attachment of a driven bicycle wheel to the driving assembly in conjunction with the attachment to the frame.

2. Discussion of Prior Art

Heretofore, the complete rear drive sprocket assembly is assembled to remain affixed to the rear wheel hub. Thus the rear drive sprocket or sprockets remain attached to the rear wheel when the rear wheel is removed from the frame. Whenever the wheel or tire is damaged, or when the bicycle must be taken apart for service or transport, the wheel, along with its drive sprocket assembly, must be removed from the frame. Such an operation is likely to be required frequently.

Since the drive chain remains with the bicycle frame when the wheel is removed, it is no longer under the tension normally supplied by the wheel sprocket. The chain now tends to dangle and drag on the ground, picking up contaminants and spreading grease onto the surfaces that it comes in contact with. The lack of chain tension also invariably causes the chain to fall off of the front sprockets as well and become tangled.

Reassembly of the wheel to the frame is also problematic, requiring a great degree of skill and dexterity. As the wheel is installed and assembled to the bicycle frame, the operator must insure that the drive chain is properly guided through a series of sprockets and pulleys associated with the rear sprockets, the front chainwheel and the rear derailleur. Further, the present state of the art involves a rear sprocket assembly with as many as eleven sprockets, each selectable via the rear derailleur. Upon reassembly of the rear wheel, the operator must insure that the derailleur is set to the outermost sprocket and that the chain is wrapped around this specific sprocket and also insure that the chain has not inadvertently become disengaged from any of the other sprockets in the drivetrain. This is often a daunting and messy task for most cyclists. While removal of the bicycle's front wheel is a relatively easy operation that may be contemplated by the novice cyclist, removal of the rear wheel is considered to be an intimidating procedure better left to the professional or to an enthusiast fluent in the mechanics of the bicycle.

Further, in a bicycle race, every second is are precious. When the wheel is then reassembled onto the frame, after the repair of a flat tire for instance, the chain will likely now be engaged with the incorrect sprocket for the given conditions as required by the racer. The racer must now waste further time to select the desired sprocket ratio.

In conventional bicycle rear hub designs, the rear wheel sprockets are commonly mounted to the rear hub through a "freewheel" subassembly, where the sprockets are pre-assembled to a one-way rotational clutch mechanism, which is then threaded onto a collar of the rear hub shell. The current state of the art involves a variation on this design and is termed a "freehub", where the one-way clutch assembly has a splined outer shell that is semi-permanently assembled to the rear hub. This type of clutch subassembly in commonly referred to as a freehub body. The individual sprockets are then slid over this splined shell to receive the bicycle chain. Further description will focus on the freehub type of arrangement although the present invention is easily adaptable to the freewheel configuration or to any other arrangement with similar function, including a sprocket assembly or other power transmission assembly that is rotationally locked to the hub without a one-way clutch.

It should be recognized firstly that the freehub body must be coupled to the hub shell to transmit torque to the rear hub and secondly that the rear hub is mounted to the frame at the two exposed ends of its stationary axle. In these conventional prior art designs, the freehub body (i.e. driving portion of the hub assembly) is fixedly coupled to the hub shell (i.e. driven portion of the hub assembly). In other words, the freehub body and hub shell remain fixed to each other during use and during removal of the wheel from the bicycle frame. Thus, the wheel is commonly assembled to the bicycle frame in a generally radial direction with the axle ends residing in slots within the flattened portions of the frame commonly referred to as "dropouts". These dropouts generally have a fixed distance of separation, leaving a predefined axial width assigned to the rear hub.

In the past, there have been some novel designs that provide a means to selectively decouple the freehub assembly from the hub shell. In other words, the freehub body (i.e. driving portion of the hub assembly) may be selectively disconnected from the hub shell (i.e. driven portion of the hub assembly). Thus, when the wheel is removed from the frame, the rear hub assembly may be split in two, with the freehub body and its associated drive sprockets, remaining attached to the frame. With the hub shell now disconnected from the freehub body, the entire wheel assembly may be removed from the frame. This type of hub assembly may be termed a "decoupling hub".

Such decoupling hubs fall into two general categories: the fixed-width type and the telescoping-width type. With fixed-width arrangements, both the driving and driven elements have a fixed axial width. Most decoupling hub arrangements require some degree of axial interference or overlap between the driving and driven elements in order to transmit torque, most often via a splined or keyed engagement. Fixed-width designs required that the bicycle frame must be flexed and the dropouts spread to accommodate this overlap so that the mating engagement splines between the hub and the drive sprockets become disengaged to facilitate removal of the wheel. Such an arrangement adds difficulty to the procedure of disassembly of the wheel from the frame and leaves the frame vulnerable to overstress in this spreading process. This is particularly true if the axial overlap is excessive and if the interface geometry of the mating elements causes the driving and driven elements to snag and/or interfere with each other during removal and/or installation of the wheel. With such prior art designs, this interface geometry also requires special skills and dexterity on the part of the operator to perform the wheel removal and/or installation process quickly and effectively.

Some examples of a fixed width decoupling hub include the Cinelli Bivalent rear hub, which saw limited use in the 1970's and is no longer available. While such designs are intended to be more user friendly than conventional hubs, this has not been the case, since the dropouts must be spread simultaneous with insertion of the hub. Further, the poor design of the aforementioned mating interface serves to make assembly and removal of the wheel a tedious and frustrating experience.

The telescoping width type of decoupling hub utilizes a separate axially slideable telescoping torque coupling element. In such an arrangement, when the torque coupling is slideably extended from either the driving or driven element, it engages both the freehub body (i.e. the driving element) and the hub shell (i.e. the driven element) for the transmission of torque between the two. In other words, when extended, the slideable torque coupling provides axial interference or overlap between the driving and driven elements in order to transmit torque. Conversely, when the torque coupling element is slideably retracted, the freehub body and the hub shell become disengaged, which allows the hub to be removed from the frame while the freehub body remains fixed to the frame. Some examples of this design are described in U.S. Pat. No. 6,374,975.

This telescoping type of configuration involves relatively high complexity with a multitude of expensive precision components. Furthermore, these slideable components create difficult sealing challenges to function in the harsh environment that bicycles are commonly subject to. It should be noted that, as of this writing, none of these designs have been commercially produced.

Accordingly, it is an objective of the present invention to overcome the forgoing disadvantages and provide an improved torque coupling arrangement, particularly as applied to a bicycle wheel.

SUMMARY OF THE INVENTION

Objects and Advantages

In accordance with the present invention, it has now been found that the forgoing objects and advantages may be readily obtained.

It is an objection of the invention to provide a torque coupling arrangement that provides easy insertion and/or removal of one of the driven and driving elements of the torque coupling arrangement. This is achieved by providing advantageous geometry to the mating components, which aids in the assembly and alignment of these components during the assembly/disassembly process. Some of this geometry includes ramped lead-in geometry, self-aligning and piloting geometry, circumferentially self-nesting geometry, and shielding geometry.

The present invention obtains many advantages. It is an advantage of the present invention to provide a decoupling hub assembly whereby the rotatably driven or driving assembly may be easily assembled and easily uninstalled or removed from its opposing driven or driving assembly, and including torque coupling between these two elements. As applied to bicycle wheels, this advantage translates to an arrangement where the driven rear wheel may be easily and simultaneously disassembled from the corresponding drive sprocket assembly and the bicycle frame. In the application described herein, the present invention relates to the rear hub of a bicycle wheel. However, the basic principles of this invention may alternatively be applied to a wide range of power transmission applications that are known throughout industry.

The present invention is particularly applicable to a decoupling engagement mechanism between the one-way clutch assembly of the bicycle sprocket assembly, commonly referred to as the freehub body, and the rear hub shell, which is the outer rotating member of the rear hub assembly. Thus, when the rear hub is uninstalled or removed from the bicycle frame, the freehub body, and its associated sprockets, remain attached to the frame. Since the sprockets are now still in place, the chain remains under tension with the rear wheel removed. Thus, all of the problems associated with the dangling chain and the complex reassembly are eliminated. This greatly reduces the difficulty involved in replacement of the rear wheel and also solves the shortcomings previously described that are associated with the conventional hub assembly. Furthermore, the chain may remain engaged with whichever sprocket had previously been selected, providing particular benefit in racing conditions where time is critical.

The present invention may utilize ramped lead-in geometry, shielding geometry, radial self-piloting geometry, and/or circumferentially self-nesting geometry. These geometry features serve to guide and align the hub upon removal and/or reinstallation of the wheel to the frame, minimizing the potential for mating components of the driving and driven elements to snag and/or interfere with each other during removal and/or installation of the wheel. In comparison with other decoupling hub designs, these geometry features make the removal and/or reinstallation of the wheel much more user-friendly and easy. Further, this also minimizes any special skills and dexterity involved in the removal and/or reinstallation of the wheel.

In the ensuing descriptions, the term "axial" refers to a direction parallel to the centerline of the wheel axle and the term "radial" refers to a direction perpendicular to the centerline of the wheel axle.

In contrast to the aforementioned decoupling arrangements that employ a slideable torque coupling element, the present invention provides a far simpler mechanism without the expensive precision components and without the difficult sealing challenges.

Further, the present invention outlines several features to optimize the functionality of the decoupling hub assembly, including means to control axial spacing and provide a solid axial stack-up of the assembly, including control shaft arrangements to aid in ease of assembly, including engagement tooth interactions to provide blocking and self-energizing engagement, including ramped lead-in geometry to provide self-aligning assembly of the system as well as camming or wedging to aid in controlling dropout spacing during assembly, including shielding systems to allow for smooth assembly without challenges relating to tangling of face teeth, including detent and spring-biased control shaft systems that optimize functionality and ease-of-use, and including several other advantageous designs as outlined herein.

The present invention relates to a torque coupling between the bicycle hub and the freehub body. The desired arrangement is that the sprockets are affixed to the freehub body and the freehub body is mounted to one dropout of the frame, preferably the right or "drive-side" dropout. Then the rear wheel, including the rear wheel hub, is fitted in the axial space between the right face of the left dropout and the left side of the freehub body. A torque engagement simultaneously engages the rear hub shell with the freehub body, allowing normal transmission of torque between the drive sprockets and the rear wheel. In any transmission of torque, there is a driving element and a driven element. Since power is transmitted from the rider through the sprockets, the freehub body would be considered as the driving element and the rear hub, which applies the torque to the tire, would be considered the driven element.

Further objects and advantages of my invention will become apparent from considering the drawings and ensuing description.

BRIEF DESCRIPTION OF THE DRAWINGS

The present invention will be more readily understandable from a consideration of the accompanying drawings, wherein:

FIG. 2b shows the freehub assembly mounted in the frame dropout, with the hub assembly positioned to be installed between the frame and the freehub assembly;

FIG. 2c shows the hub assembly positioned between the frame dropout and the freehub assembly, with the control shaft still in the retracted position;

FIG. 2d shows the hub assembly positioned between the frame dropout and the freehub assembly, with the control shaft extended and engaged with the freehub assembly;

FIGS. 2e-p are axial cross-sectional views of the embodiment of FIG. 2a, showing the progressive sequential steps involved in assembling the hub assembly to the frame and the freehub assembly;

FIG. 2e shows the freehub assembly mounted in the frame dropout, with the hub assembly positioned to be installed between the frame and the freehub assembly, corresponding to the assembly sequence described in FIG. 2b;

FIG. 2f is an enlarged detail view corresponding to the assembly sequence of FIG. 2e and detailing the interface geometry of the hub assembly and freehub assembly;

FIG. 2g is an enlarged detail view detailing the interface geometry of the hub assembly and freehub assembly during assembly, as the hub assembly is initially brought into contact with the freehub assembly;

FIG. 2h is an enlarged detail view detailing the interface geometry of the hub assembly and freehub assembly during assembly, as the hub assembly is advanced toward an assembled and installed position to overlap the freehub assembly;

FIG. 2i is an enlarged detail view detailing the interface geometry of the hub assembly and freehub assembly during assembly, as the hub assembly is further advanced toward an assembled and installed position to overlap the freehub assembly;

FIG. 2j is an enlarged detail view detailing the interface geometry of the hub assembly and freehub assembly during assembly, as the hub assembly is still further advanced toward an assembled and installed position to overlap the freehub assembly;

FIG. 2k is an enlarged detail view corresponding to the assembly sequence of FIG. 2c, detailing the interface geometry of the hub assembly and freehub assembly during assembly, as the hub assembly is yet further advanced into alignment with the freehub assembly;

FIG. 2L is a view corresponding to the assembly sequence of FIG. 2k and showing the hub assembly, freehub assembly and the dropouts of the frame;

FIG. 2m is an enlarged detail view corresponding to the assembly position of FIG. 2k and showing the interface between the hub assembly and dropout;

FIG. 2n is a view corresponding to the assembly sequence of FIG. 2d and shows the hub assembly with the control shaft extended and engaged with the freehub assembly to simultaneously clamp the left dropout;

FIG. 2p is an enlarged detail view corresponding to the assembly sequence of FIG. 2n and detailing the interface geometry of the hub assembly and freehub assembly, with the control shaft engaged to the freehub axle;

FIGS. 9a-d are axial cross-sectional views of a third embodiment of the present invention, detailing the geometry of the mating engagement teeth of both the driving and driven elements, and illustrating the sequential steps involved in bringing these two elements into rotary engagement, including face teeth with ramped surfaces at their radially inboard and outboard peripheries;

FIGS. 10a-d are axial cross-sectional views of a fourth embodiment of the present invention, detailing the geometry of the mating engagement teeth of both the driving and driven elements, and illustrating the sequential steps involved in bringing these two elements into rotary engagement, including integral guide rings.

DETAILED DESCRIPTION OF THE INVENTION

Figure 1:
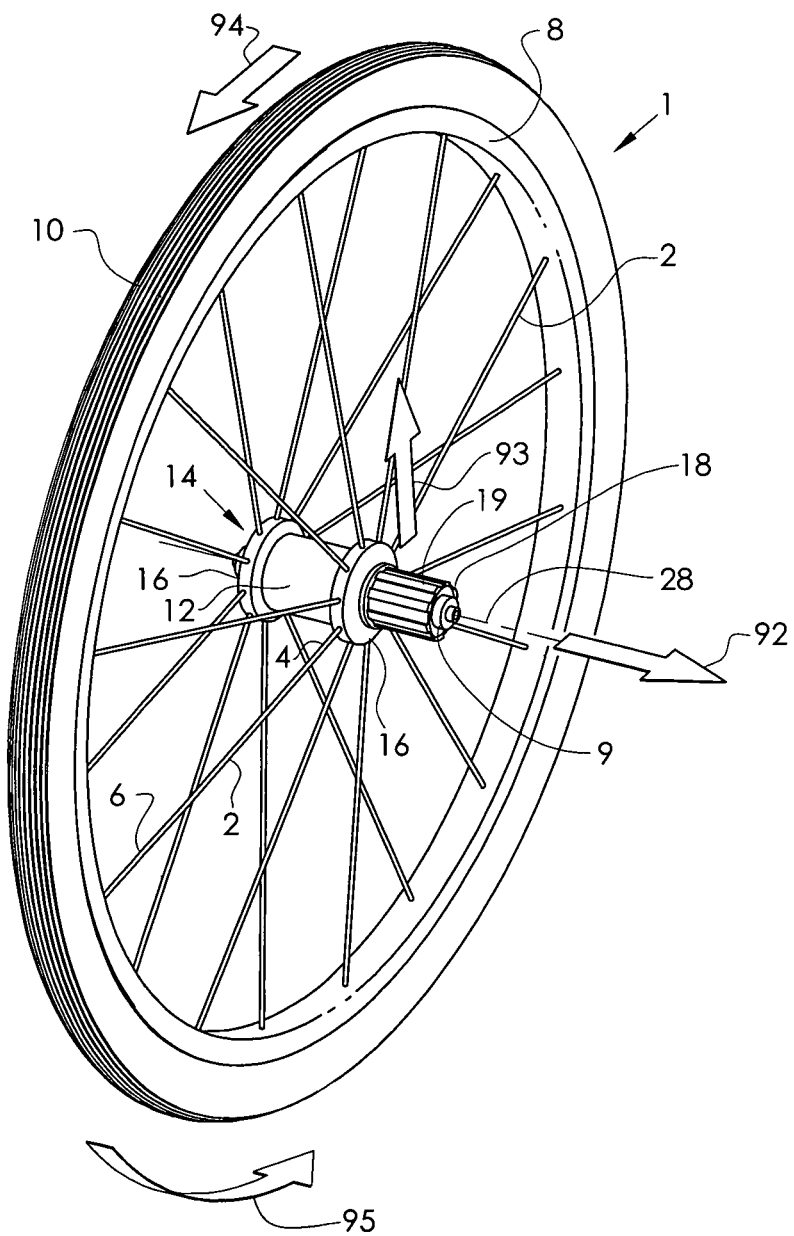
FIG. 1 is a perspective view schematically illustrating the general configuration of a prior art vehicle wheel as applied to a bicycle wheel.

FIG. 1 describes the basic configuration of an exemplary prior art vehicle wheel, in particular, a bicycle wheel 1, as well as a description of the direction conventions used throughout this disclosure. The hub shell 14 is rotatable about the axle 9 and includes at least two axially spaced hub flanges 16, each of which include a means for connecting with the spokes 2. The axial axis 28 is the axial centerline of rotation of the bicycle wheel 1. The hub flange 16 may be contiguous with the hub shell 14 or it may be separately formed and assembled to the hub body 12 portion of the hub shell 14. The spokes 2 are affixed to the hub flange 16 at their first end 4 and extend to attach the rim 8 at their second end 6. The tire 10 is fitted to the outer periphery of the rim 8. The freehub body 18 is rotationally coupled to hub shell 14 via a one-way clutch and also includes splines 19, which are adapted to receive the drive sprocket(s) (not shown). The wheel of FIG. 1 is generic and may be of tension-spoke or compression-spoke design.

The axial direction 92 is any direction parallel with the axial axis 28. The radial direction 93 is a direction generally perpendicular to the axial direction 92 and extending generally from the axial axis 28 radially outwardly toward the rim 8. The tangential direction 94 is a direction generally tangent to the rim at a given radius. The circumferential direction 95 is a cylindrical vector that wraps around the axial axis 28 at a given radius. A radial plane is a plane perpendicular to the axial axis 28 that extends in a generally radial direction at a given axial intercept. An axial plane is a plane that is generally parallel to the axial axis. An orientation that is radially inboard is nearer to the axial axis 28 of rotation and a radially outboard is further from the axial axis.

Figure 2A:
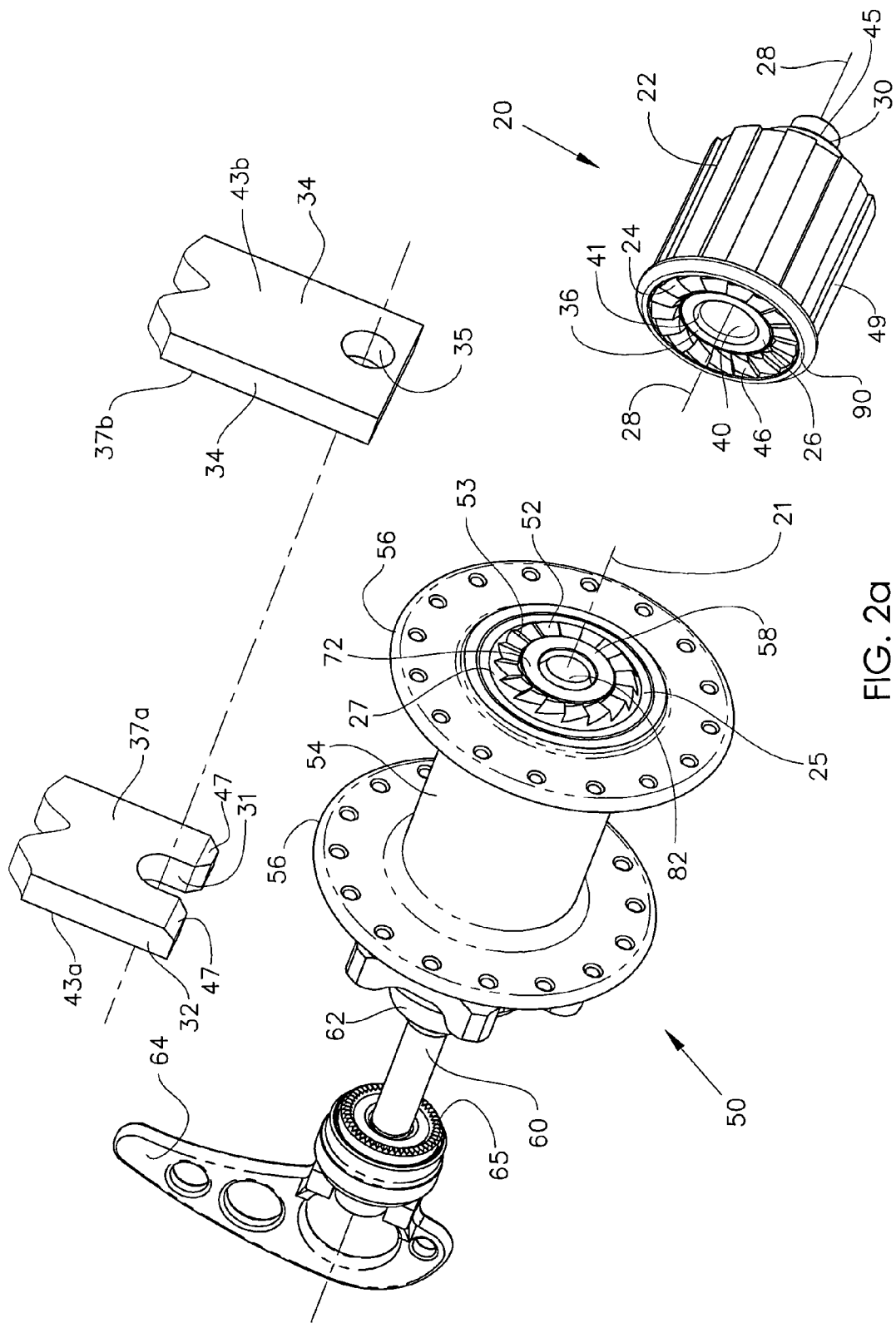
FIG. 2a is an exploded perspective view of an embodiment of the present invention, showing a the freehub assembly separated from the hub assembly, particularly illustrating their respective engagement face teeth.
Figure 2B:
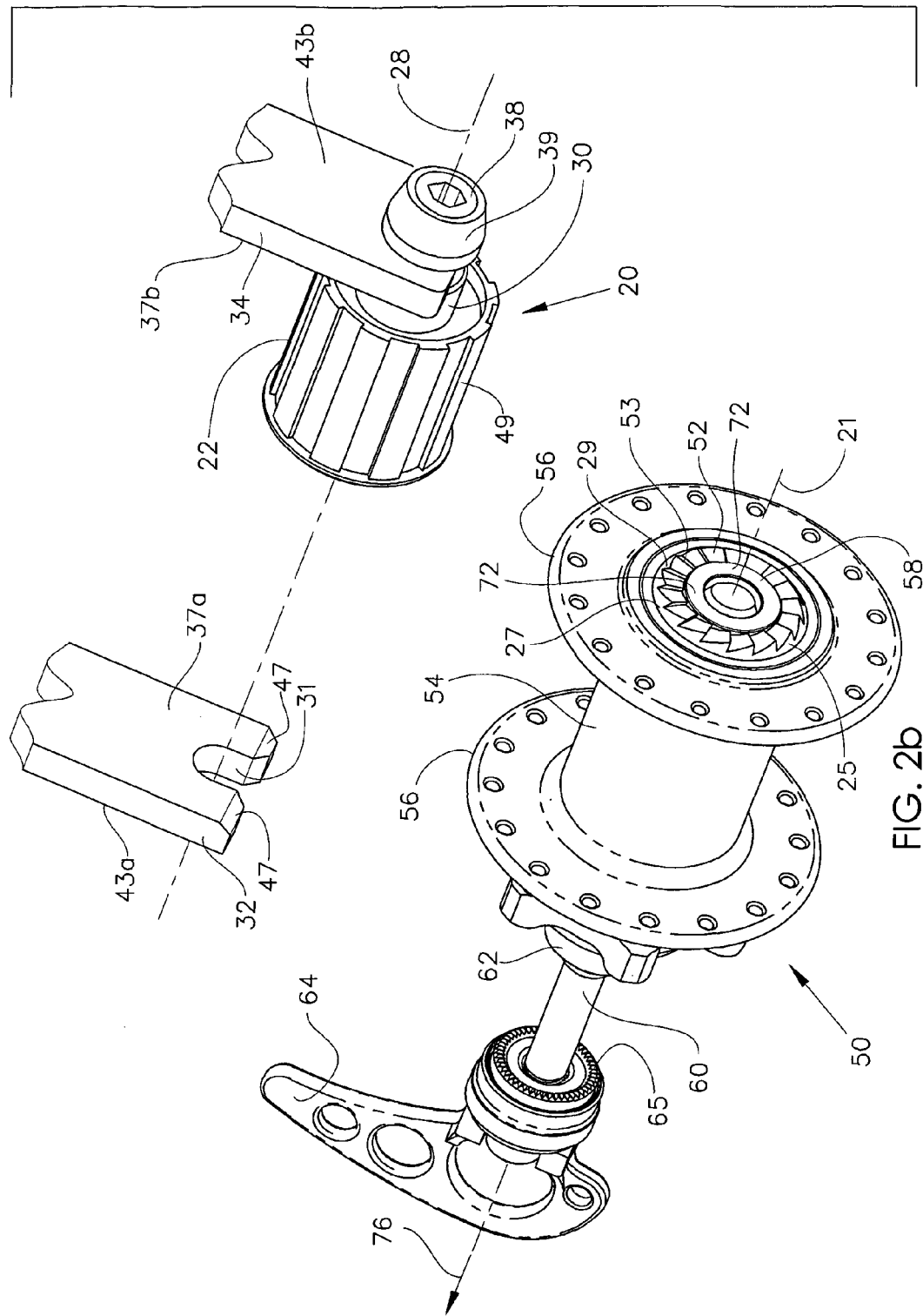
FIGS. 2b-d are exploded perspective views of the embodiment of FIG. 2a, showing the progressive sequential steps involved in assembling the hub assembly to the frame and the freehub assembly.
Figure 2C:
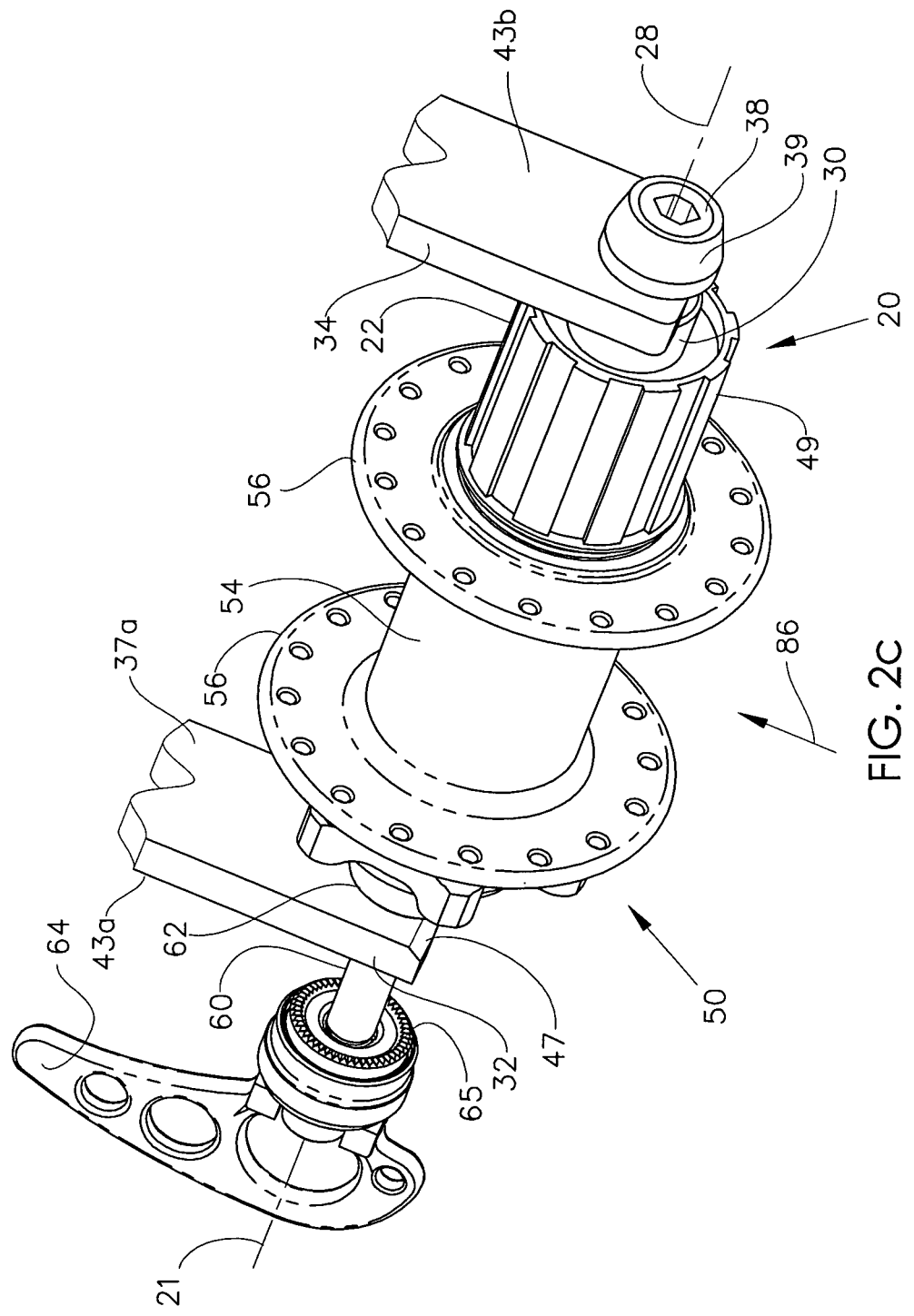
Figure 2D:
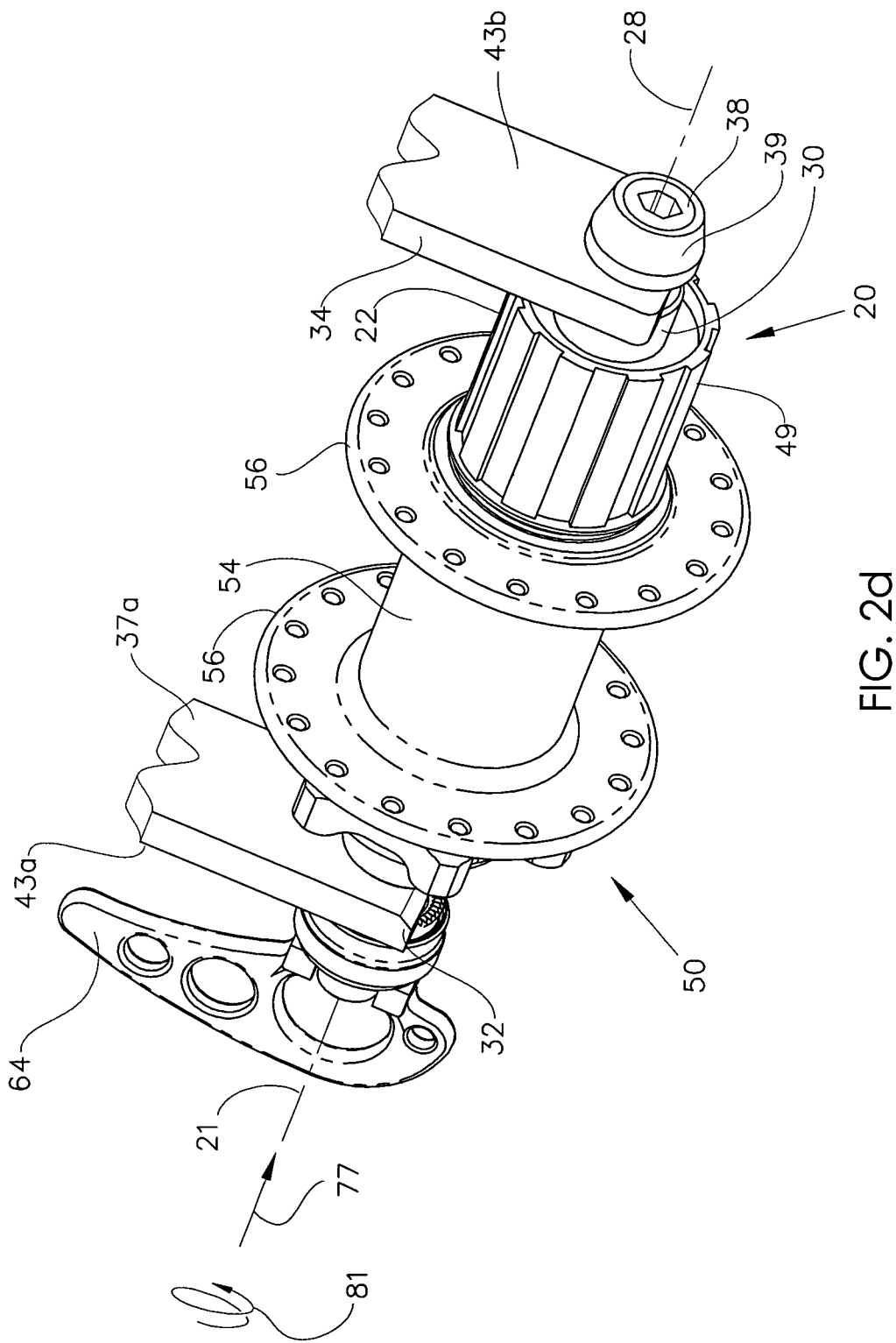
Figure 2E:
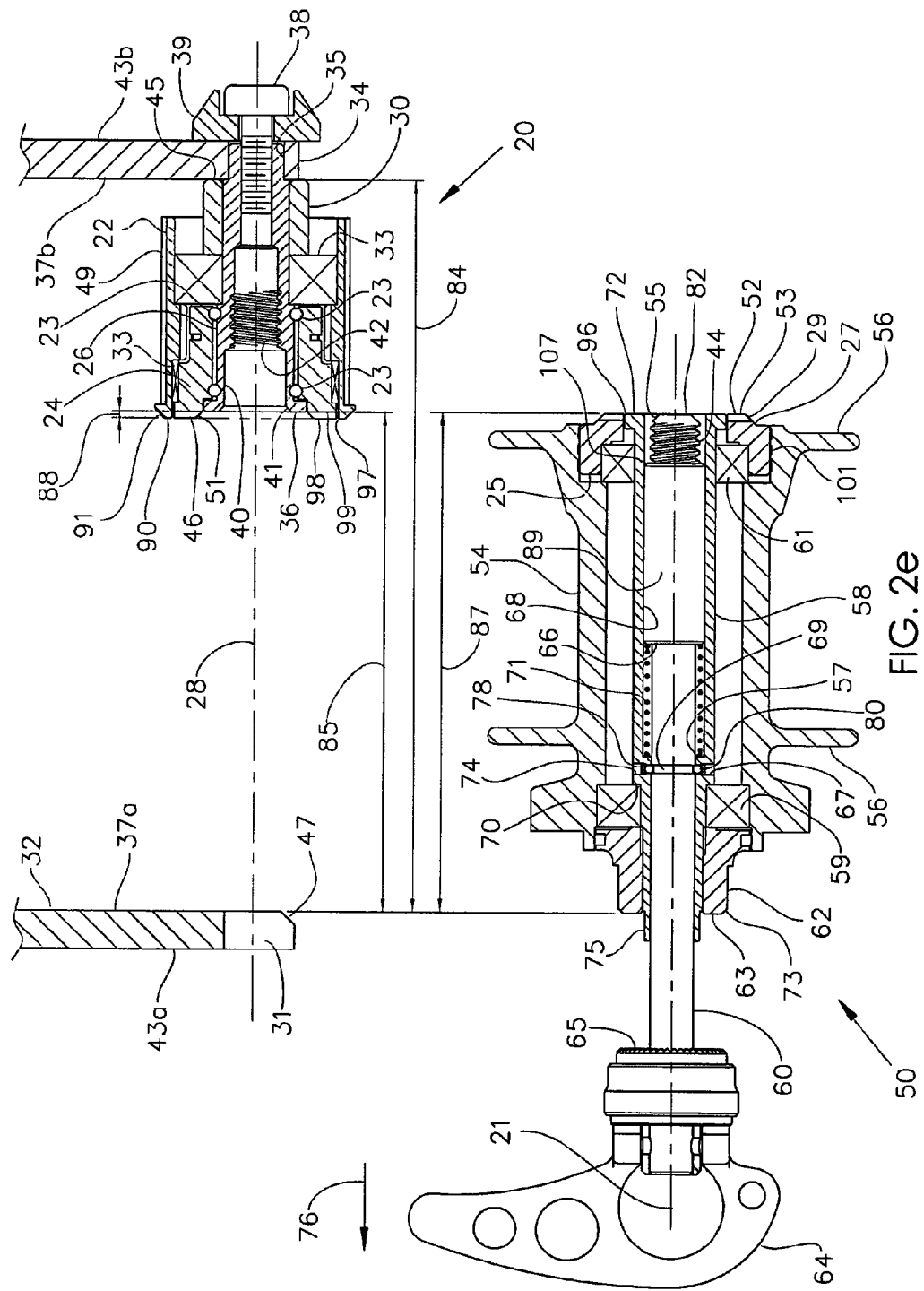
Figure 2J:
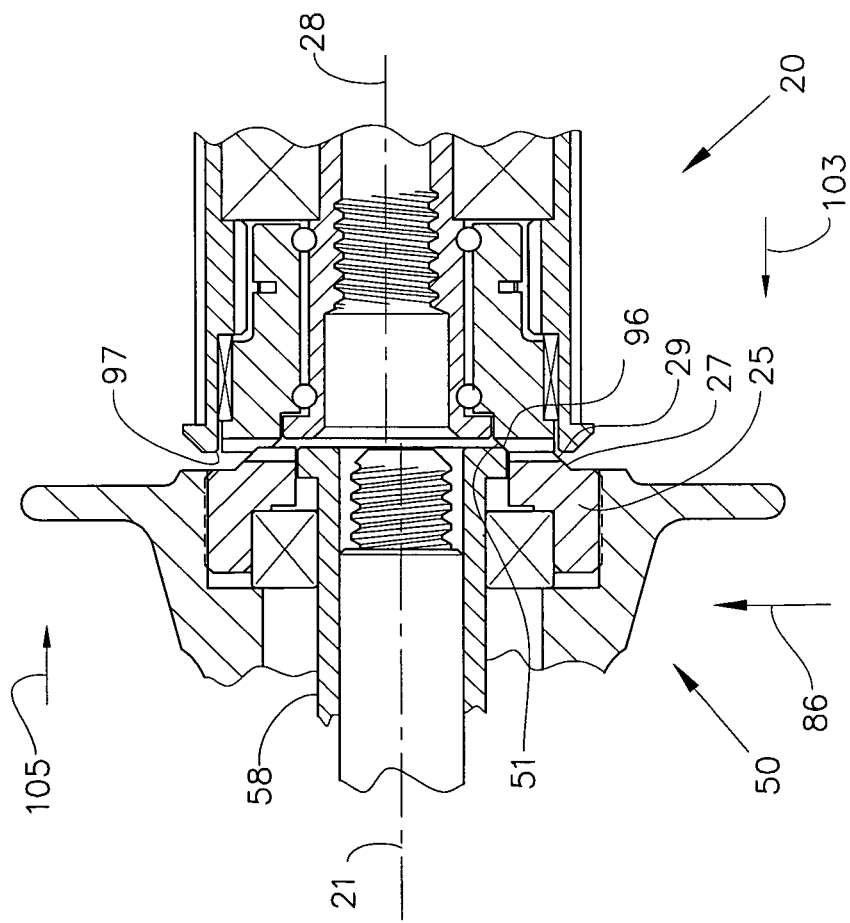
Figure 2L:
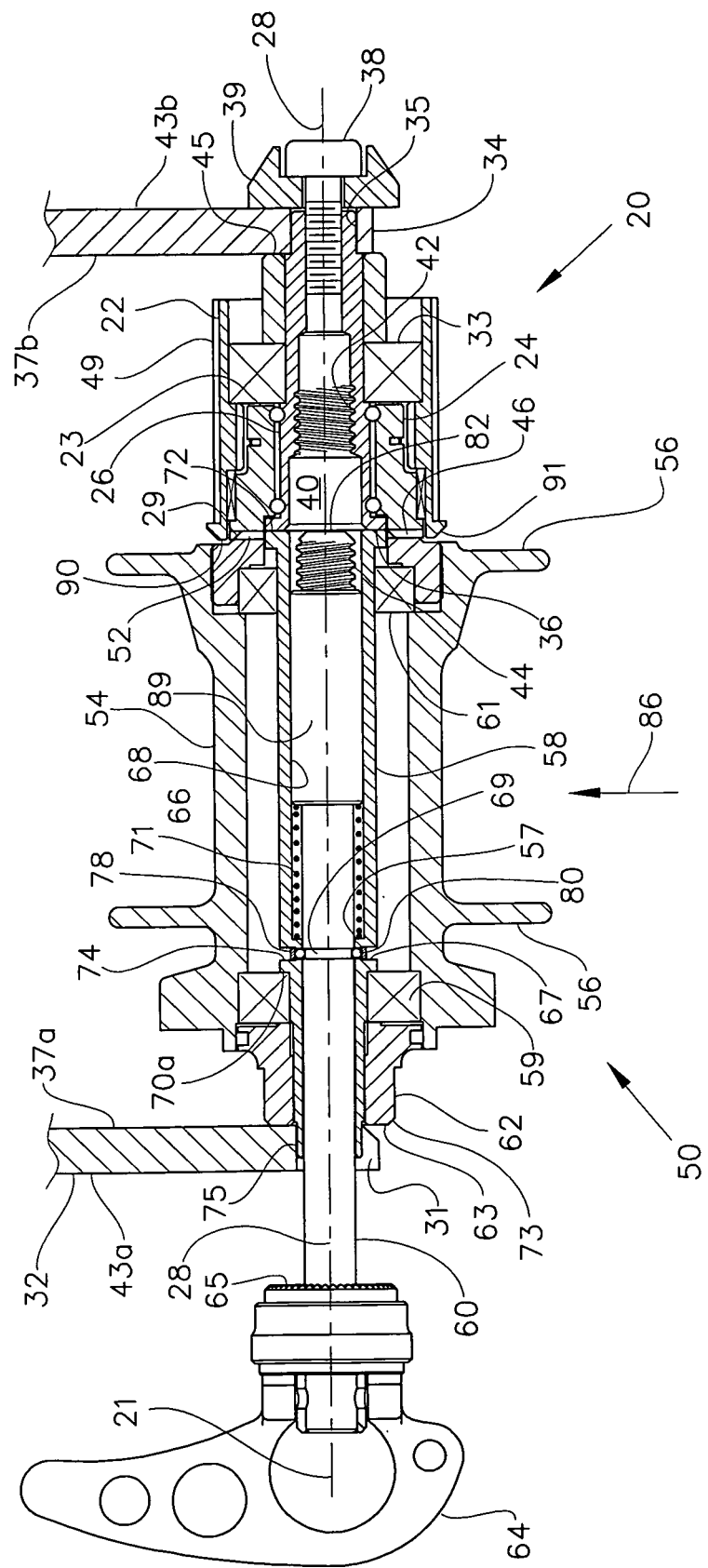
Figure 2M:
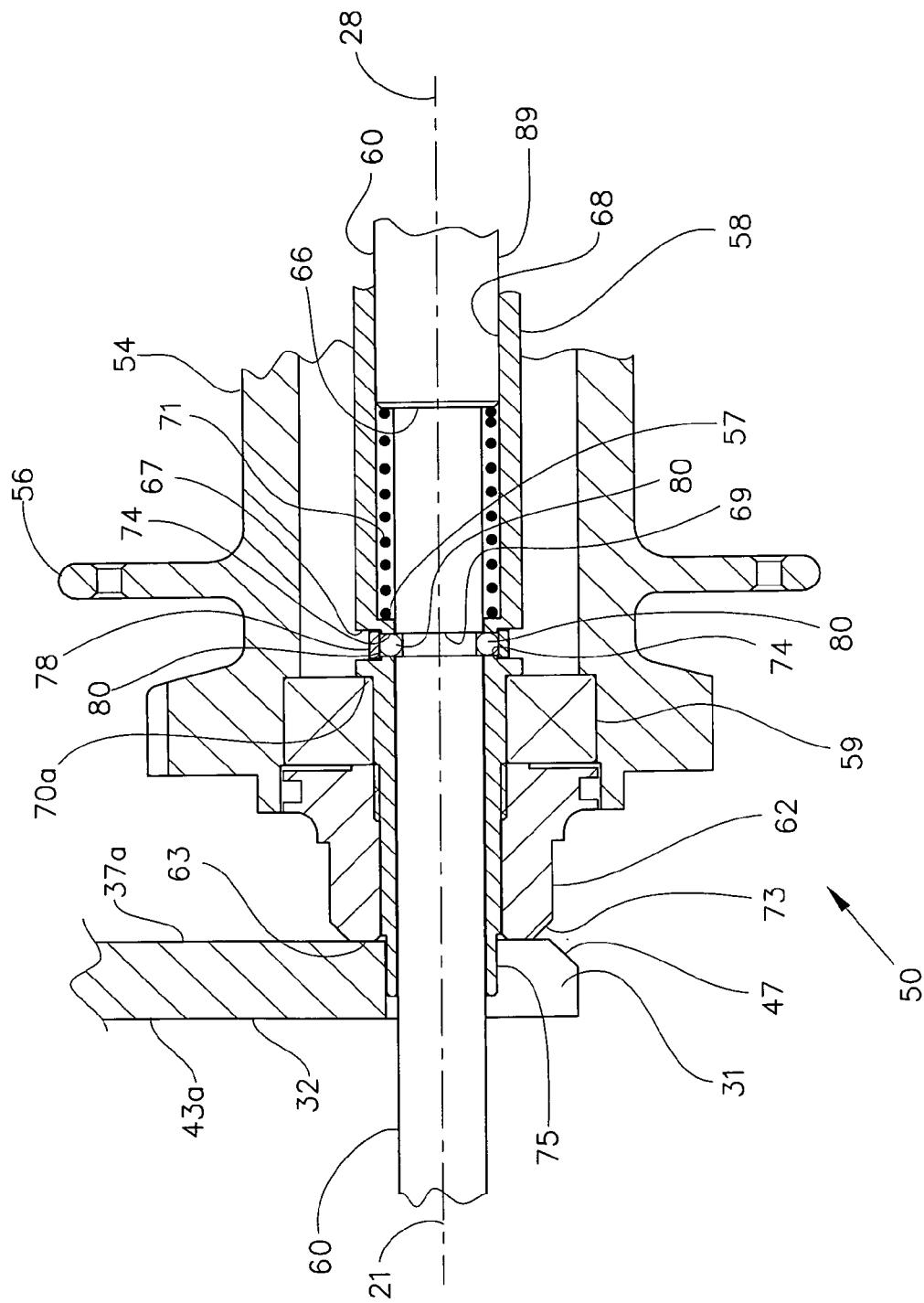
Figure 2N:
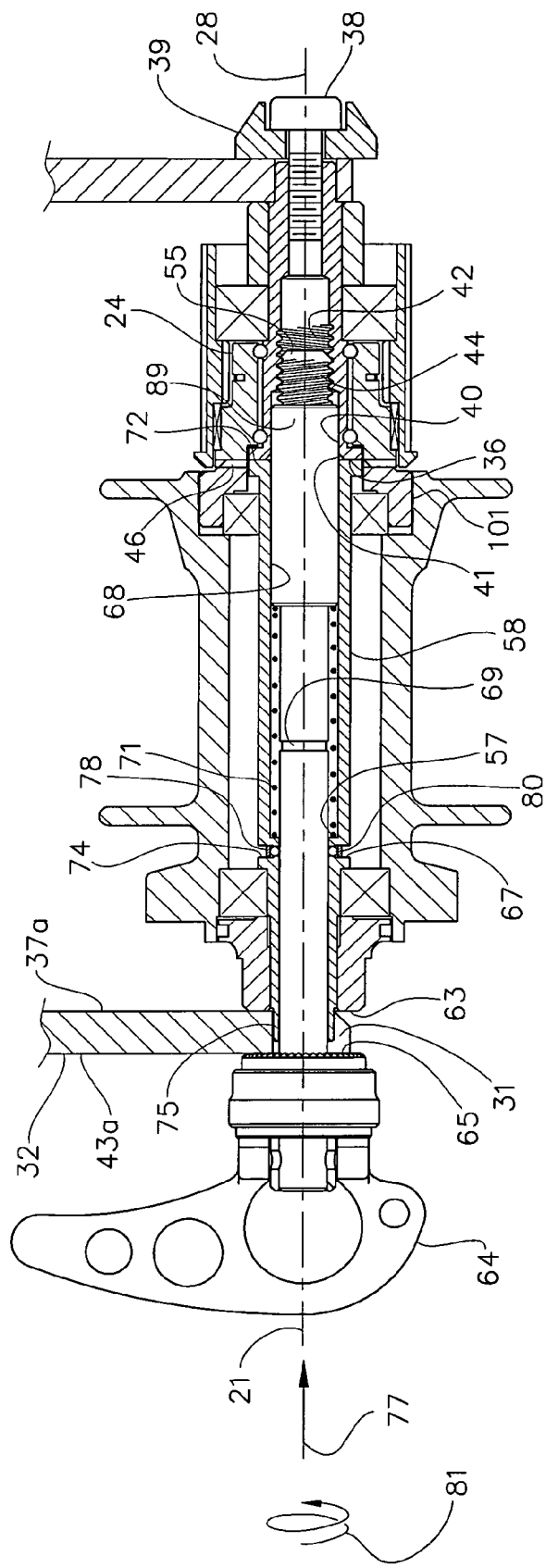
Figure 2P:
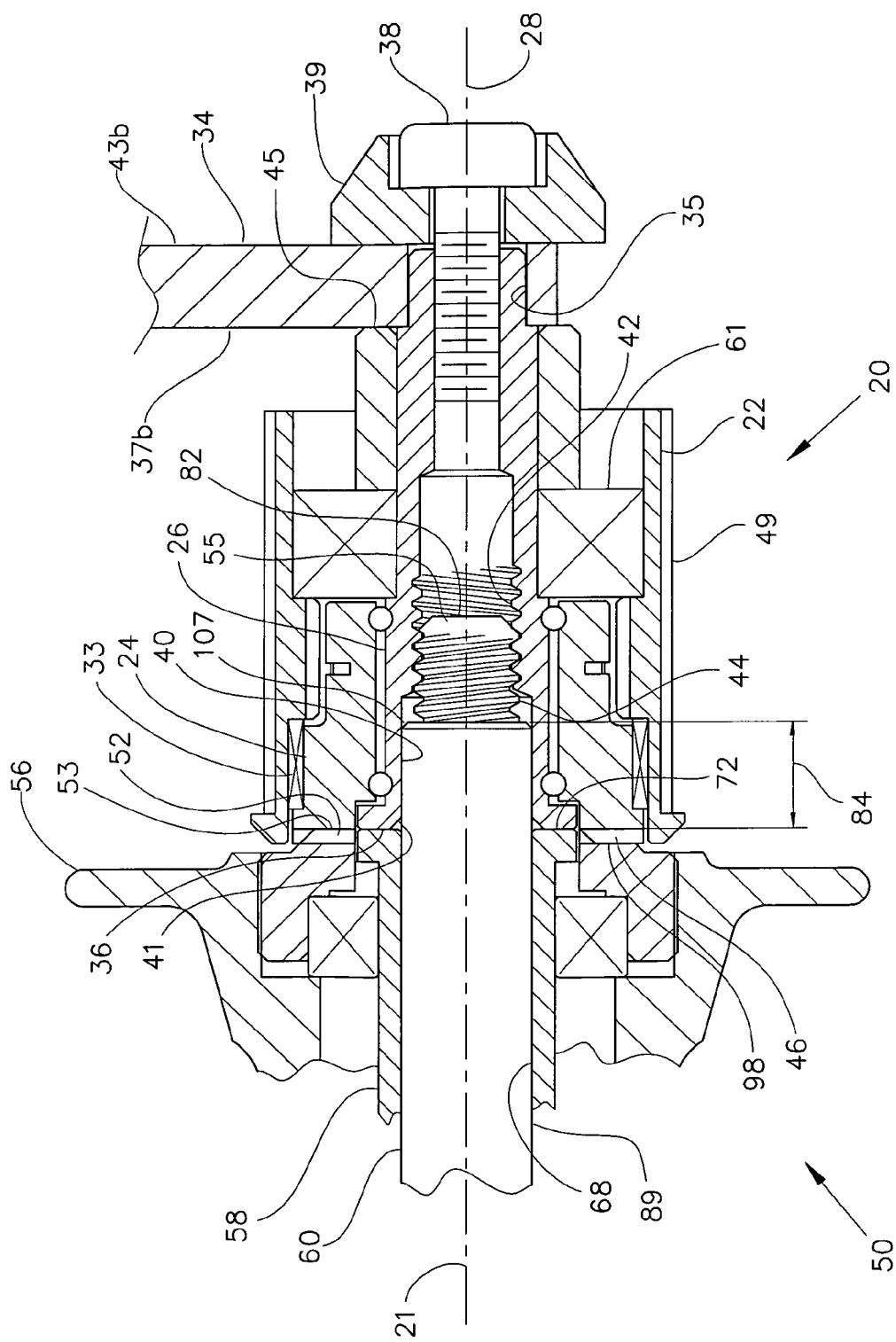

FIGS. 2a-p describe an embodiment of the present invention that illustrates the torque coupling assembly as applied to rear hub of a bicycle wheel. FIG. 2a shows two of the basic components of the embodiment described in FIGS. 2a-p: the freehub assembly 20 and the hub assembly 50, shown here prior to their mounting in a frame. The freehub assembly 20, with its driving sprockets (not shown) attached may be considered as the driving element, while the hub assembly 50, which is driven by the freehub assembly 20, may be considered as the driven element. In other words, torque is transmitted from the driving assembly (i.e. freehub assembly 20) to the driven assembly (i.e. hub assembly 50). The hub assembly 50 rotates about an axial axis 21 and includes coupling ring 25 with face teeth 52. The freehub assembly 20 rotates about an axial axis 28 and includes face teeth 46 that may be engaged with face teeth 52 to transmit torque between the freehub assembly 20 and the hub assembly 50. For explanation purposes, it should be understood that an axially proximal orientation is axially closer to the associated driving assembly or driven assembly. Similarly, an axially distal orientation is axially farther from the associated driving assembly or driven assembly, and extending toward the non-associated one of the axially driving assembly or driven assembly.

The hub assembly is centered on its axial axis 21 and includes hub shell 54 with coupling ring 25, control shaft 60 with handle 64 and face 65, and spacer sleeve 58. The freehub assembly 20 is centered on its axial axis 28, and includes freehub axle 26, torque shell 24 with face teeth 46 and freehub shell 22.

The bicycle frame commonly provides a solid armature to which the hub assembly 50 and freehub assembly 20 are mounted. The frame (not shown) commonly includes a left dropout 32 and a right dropout 34, with the dropouts providing a mounting interface with the hub. In this case, the hub assembly 50 interfaces with the left dropout 32 and the freehub assembly 20 interfaces with the right dropout 34, as illustrated in FIG. 2c. The left dropout 32 includes inside face 37a, outside face 43a, slot 31 and chamfers 47. The right dropout 34 includes inside face 37b, outside face 43b, and hole 35 therethrough for passage of fixing bolt 38. Since wheel removal does not require removal of the freehub assembly 20, such a through hole arrangement is preferable, since an enclosed hole 35 is more structurally robust than the open slot more commonly associated with conventional dropouts. Of course, the arrangement shown in these figures could be easily fitted to a slotted right dropout 34 as well. It should be noted that dropouts 32 and 34 are merely shown here as representative elements to which the hub assembly and freehub assembly are mounted. In actual practice, the dropout will commonly also include geometry and provision for mounting of additional components, including a rear derailleur, frame tubes, racks, fenders, etc.

FIGS. 2b-d describe the general sequence involved in the assembly installation of this embodiment of the present invention. As shown in FIG. 2b, the freehub assembly 20 is mounted in the right dropout 34 via fixing bolt 38 and washer 39. It is understood that the chain (not shown) and sprockets (not shown) are engaged to the freehub assembly in the conventional manner. The hub assembly 50 is also axially positioned between the freehub assembly 20 and the left dropout 32 in preparation for installation of the hub assembly 50. Next, as illustrated in FIG. 2c, the hub assembly 50 is moved in a generally radial direction 86 to position it directly between the freehub assembly 20 and the left dropout 32 such that the axial axis 21 of the hub assembly is collinear with the axial axis 28 of the freehub assembly. Next, as illustrated in FIG. 2d, the control shaft 60 and associated handle 64 are shuttled in direction 77, toward an extended position, such that the control shaft 60 engages the freehub axle 26. Finally, the handle 64 is rotated in direction 81 to threadably engage the control shaft 60 with the freehub axle 26 and simultaneously sandwich and clamp the left dropout 32. The hub assembly 50 is now securely installed and assembled to the left dropout 32 and the freehub assembly 20, with the face teeth 52 also engaged to face teeth 46 for transmission of torque between the freehub assembly 20 and the hub assembly 50. This completed assembly is now fully functional ready for operation in the normal manner.

The procedure for uninstallation and removal of the hub assembly 50 is basically the reverse of the installation procedure just described. It is noted that, upon removal of the hub assembly 50, the freehub assembly 20 remains assembled to the right dropout 34 and the sprockets (not shown) and chain (not shown) remain assembled and properly positioned with the freehub assembly 20. It may be seen that installation and removal of the hub assembly 50 is now independent of the complications associated with interaction of the chain and sprockets, thereby greatly simplifying this process.

FIGS. 2e-p provide further detail of the assembly procedure as described in FIGS. 2b-d.

As particularly illustrated in FIGS. 2e and 2f, the freehub assembly 20 is composed of three concentric cylindrical members, the freehub axle 26, the torque shell 24, and the freehub shell 22, which may each rotate relative to each other about the same axial axis 28. The radially inboard element is the freehub axle 26, which is shown to remain stationary and is fixed to the right dropout 34 via fixing bolt 38 and washer 39. The freehub axle 26 has a left face 36, a receiver bore 40, chamfer 41, and internal threads 42 that mate with the external threads 44 of the control shaft 60 upon assembly. The freehub axle 26 also includes a right axlecap 30, with right face 45.

The torque shell 24 surrounds the freehub axle 26 and includes axial projections or face teeth 46, with associated pointed crests or tips 98 and roots 99, that are arranged in a circumferential ring and protrude axially to mate with the opposing face teeth 52 of the hub assembly 50 upon assembly. Face teeth 46 include pointed crests or tips 98 at their axially distal extremes and ramped bevels 51 adjacent their radially inboard regions. The torque shell 24 is rotatable about the freehub axle 28 via bearings 23.

The freehub shell 22, which carries the drive sprockets (not shown), is coupled to the torque shell 24 via a one-way clutch (not detailed here), allowing these two components to be rotationally locked to each other in the driving direction of rotation and to freewheel in the opposed reverse-driving or freewheeling direction of rotation. Such an arrangement that incorporates a one-way clutch is common in the cycling industry. The freehub shell 22 also includes outer splines 49 to mate with the drive sprockets (not shown) in the conventional manner. The freehub shell 22 circumferentially surrounds and axially overlaps the radially outboard portion of the teeth 46 as shown, and includes edge 97, ramped chamfer 91, and radially extending guide face 90 that is shown to be generally axially coincident or flush with the tips 99 of the teeth 46. It is noted that ramped chamfer 91 constitutes a ramped transition from a region that is axially proximal and radially outboard the freehub assembly 20 to a region that is axially distal and radially inboard the freehub assembly 20. Also, the axial distance of this ramped chamfer 91 overlaps the axial distance between the tip 98 and root 99 of face teeth 46. Further, the freehub shell 22 may be considered to include shielding geometry that extends in an axially distal direction to overlap the axial distance between the tip 98 and root 99 of face teeth 46. It is preferable that guide face 90 is radially close or adjacent to face teeth 46 to provide optimal shielding. The freehub shell 22 rotates about the torque shell 24 and freehub axle 26 via bearings 33.

The hub assembly 50 includes an outer hub shell 54 which functions much the same as a conventional bicycle hub shell in that it includes flanges 56 for attachment of the spokes (not shown), which are fixed, at their outer ends, to the rim (not shown), to which a tire (not shown) is fitted. The hub shell 54 is rotatable about the spacer sleeve 58 via bearings 59 and 61. The coupling ring 25 is firmly locked to the hub shell 54 via a threaded interface 101 and includes axial projections or face teeth 52. Spacer sleeve 58 and control shaft 60 are shown to be non-rotational and are fixed to the left dropout 32 upon assembly or installation.

Spacer sleeve 58 includes a step 57 and a central bore 68 to receive the control shaft 60. Spacer sleeve 58 also includes end face 72, edge 96, stub end 75 and shoulder 70, which bears against the inner race of bearing 59 and serves to control the axial location of the spacer sleeve 58 relative to the hub shell 54. Axlecap 62 includes radial face 63 and chamfer 73 and is threaded and locked onto the spacer sleeve 58 as shown to capture the inner race of bearing 59.

The chamfer 73 provides ramped lead-in geometry to interface with the left dropout 32 and aid in axial self-guiding alignment upon radial assembly with the left dropout 32. Similarly, the left dropout 32 includes chamfers 47, to provide ramped lead-in geometry to interface with the axlecap 62 and aid in axial self-guiding alignment upon radial assembly hub assembly 50.

Concentric within the spacer sleeve 58 is the control shaft 60, which is both (axially) slideable and rotatable within the spacer sleeve 58. The control shaft 60 includes a handle 64 on its left end for user manipulation and a face 65, which contacts the outside face 43*a* of the left dropout 32 upon assembly. External threads 44 on the right end of the control shaft 60 serve to engage with the internal threads 42 of the freehub axle 26 upon assembly. Control shaft 60 also includes pilot portion 89, chamfer 107, step 66, circumferential groove 69, end face 82 and tapered end 55. Pilot portion 89 has a generally smooth outer diameter that has a close clearance fit with the inside diameter of the central bore 68 and the receiver bore 40. A compression spring 71 surrounds the control shaft 60, with its ends braced between the step 66 of the control shaft 60 and the step 57 of the spacer sleeve 58. With the control shaft 60 in the retracted position, as shown in FIG. 2*e*, the compression spring 71 is axially compressed and pre-loaded to provide a bias force to shuttle the control shaft 60 to the right towards its extended position as shown in FIG. 2N.

Spacer sleeve 58 includes radial holes 74 that serve to receive detent balls 80 and circumferential groove 67 to receive and retain a circumferentially wrapped spring 78, which serves to bias the detent balls 76 radially inwardly. With the control shaft 60 fully retracted in the direction 76 relative to the spacer sleeve 58 in the axially proximal position shown in FIGS. 2*a-c* and 2*e-m*, compression spring 71 is axially compressed and groove 69 is axially aligned with holes 74. This axial alignment permits the detent balls 80 to move radially inwardly to lodge within groove 69, as induced by the circumferential contraction of the spring 78. Thus the detent balls 80 serve to provide a linear detent to temporarily retain the control shaft 60 in the retracted position. In this retracted position, the end face 82 of the control shaft 60 is either flush or recessed relative to the end face 72 of the spacer sleeve 58. When the control shaft is then urged in the direction 77 as show in FIGS. 2*d*, 2*n*, and 2*p*, detent balls 80 are ramped radially outwardly out of groove 69, circumferentially stretching spring 78 and permitting the control shaft 60 to easily extend further in the direction 77 to an axially distal position. The aforementioned preload of spring 78 serves to bias and push the control shaft 60 toward its extended position. It should also be noted that, with the spring 78 compressed to its solid height, the step 57 of the spacer sleeve 58 and the step 66 of the control shaft 60 serve to provide an axial limit stop to limit the extent that the control shaft 60 may be retracted in direction 76.

This linear detent system serves to temporarily retain the control shaft 60 in the retracted position as a convenience for ease of assembly as the hub assembly 50 is brought into position between the left dropout 32 and the freehub assembly 20 as shown in FIGS. 2*c* and 2*f-m*. When the control shaft 60 is urged in the direction 77 as described, the compression spring 71 serves as a means to bias and push the control shaft and external threads 44 toward its axially distal extended position in the direction 77 (as shown in FIGS. 2*d*, 2*n* and 2*p*), for engagement with the freehub assembly 20. It should be noted that the spring-biased detent system described herein provides a convenience and is not a requisite for the proper functionality of the present invention. Also, the details of the spring-biased detent system described herein are merely a representative design to provide this function. A wide range alternative arrangements may be employed to provide similar functionality as dictated by geometric constraints and the desired function.

The coupling ring 25 includes face teeth 52 fixed thereto that are arranged in a cylindrical ring and protrude axially to mate with corresponding face teeth 46 of the freehub assembly 20 upon assembly. As the driving sprockets (not shown) are fixed to the freehub shell 22, which is engaged to the torque shell 24, the torque shell may be considered as the "driving shell". Similarly, as the face teeth 52 are rotationally fixed to the outer hub shell 54, the hub shell 54 may be considered as the "driven shell". Since the torque shell 24 is rotatable about the freehub axle 26, the freehub axle 24 may be considered as the "driving axle". Similarly, since the hub shell 24 is rotatable about the spacer sleeve 58, the spacer sleeve 58 may be considered as the "driven axle".

As shown in FIGS. 2*b-p*, the freehub assembly 20 is first mounted in the right dropout 34, with fixing bolt 38 through hole 35 and with the right dropout 34 firmly sandwiched and gripped between the washer 39 and the right face 45. Next, the installation of the hub assembly 50 is achieved as follows:

As shown in FIGS. 2b and 2e, the control shaft 60 is in the retracted position and the hub assembly 50 is positioned axially such that the face 63 is generally axially aligned with the inside face 37a of the left dropout 32 and the end face 72 of the spacer sleeve 58 is generally axially aligned with the left face 36 of the freehub axle 26. As shown in FIG. 2e, the dropout spacing 84 between the inside faces 37a and 37b is defined by the frame (not shown) to which the dropouts 32 and 34 are attached. It should be noted that the tips 98 of face teeth 46 are axially flush with the guide face 90 of the freehub shell 22 and the roots 99 of face teeth 46 are generally axially flush with the left face 36 of the freehub axle 26. Guide face 90 is separated from left face 36 by distance 88, which also generally corresponds to the axial distance between tips 98 and roots 99. Also, the tips 53 of face teeth 52 of the coupling ring 25 are shown to be axially flush with the end face 72 of the spacer sleeve 58. It is preferable that end face 72 is also radially close or adjacent to face teeth 52 (as shown) to provide optimal shielding.

The inside face 37a of left dropout 32 is spaced from the left face 36 by distance 85, which defines the axial envelope to receive the hub assembly 50. The distance 87, which may be considered as the hub spacing, is the axial distance between the face 63 and the end face 72. The distance 87 generally corresponds to the distance 85. It should be noted that the guide face 90 and the extreme tips 53 of the face teeth 52 are axially distal from left face 36 to axially reduce distance 85 by distance 88, which also roughly corresponds to the axial distance between tip 53 and root 99. It should be noted that, if distance 85 is generally equal to distance 87 (as is illustrated in these figures), then distance 88 represents an axial interference that may potentially impede the easy installation of the hub assembly 50 between the left dropout 32 and the freehub assembly 20. It is an object of the present invention to provide geometry to facilitate this installation despite this axial interference.

The sequence of FIGS. 2f-j illustrate the interaction between the hub assembly 50 and the freehub assembly 20 during this installation process. Firstly, it should be understood that the frame may be flexed slightly without being overstressed and incurring damage. Thus distance 84 between dropouts 32 and 34 may be temporarily increased slightly to allow the hub assembly 50 to be installed to overcome the axial interference distance 88. However, since the operator that is performing this installation has only two hands (one to steady the bicycle and one to hold the wheel), it is difficult to simultaneously spread the dropouts. Therefore, the present invention includes geometry to align, wedge and guide the hub assembly 50 during its installation and removal.

FIG. 2f generally corresponds to FIG. 2e and shows the hub assembly 50 prior to installation. In further detail, it may be seen that face teeth 52 include ramped bevels 29 on their radially outboard edge. Also, the coupling ring 25 includes a chamfer 27, defining a surface that is generally aligned with bevels 29 as shown.

FIG. 2g shows the hub assembly 50 being installed in direction 86 and initially contacting and interfacing with the freehub assembly 20. It may be seen that the chamfer 27 and bevels 29 of the coupling ring 25 are contacting the chamfer 91 of the freehub shell 22. By pressing the hub assembly 50 in direction 86, the wedging interaction of the ramped surfaces of chamfer 27 and bevels 29 at their interface with the ramped chamfer 91 induces the hub assembly 50 to displace axially to the left in direction 103 and to displace the freehub assembly 20 and right dropout 34 axially to the right in direction 105 as shown in FIG. 2h. Simultaneously, the ramped chamfer 73 of axlecap 62 has a wedging interface upon contact with the ramped chamfers 47 of the left dropout 32, which causes the left dropout 32 to displace axially to the left in direction 103. Thus, the insertion of the hub assembly 50, as shown in FIG. 2f, serves to cam and wedge the dropouts 32 and 34 to a slightly spread apart position to allow the hub assembly 50 to pass between the left dropout 32 and the freehub assembly 20. With the dropouts 32 and 34 spread, the frame (not shown) is temporarily elastically flexed and stretched to accommodate this spread position. As described herein, the chamfer 27, bevels 29, chamfer 91, bevels 51, chamfer 73, and chamfers 47 all constitute ramped lead-in geometry to wedge, align and guide the hub assembly 50 as it is installed between the left dropout 32 and the freehub assembly 20.

While it is common in standard machining practice to break sharp corners with slight chamfer, it is noted that, with the ramped lead-in geometry described herein, the corresponding chamfers and bevels are preferably considerably more substantial and are purposefully created to provide a ramped surface. Further, while the ramped surfaces illustrated in FIGS. 2a-p are shown as straight chamfers, it is also envisioned that these surfaces may alternatively be rounded edges or other alternate ramped lead-in geometry. It is noted that ramped chamfer 91 is exemplary of a ramped surface with ramped lead-in geometry that is radially outboard of the face teeth 46 and is exemplary of a continuous circumferential ramped surface. Similarly, bevels 51 are exemplary of ramped surface with ramped lead-in geometry that is radially inboard of face teeth 46 and, due to the discontinuous nature of the individual face teeth 46, are exemplary of a discontinuous circumferential ramped surface. Conversely, if this ramped lead-in geometry were not present, and instead square-shoulder geometry was substituted (as shown in prior art designs), there would exist a blocking interference between the hub assembly and the freehub assembly and/or left dropout, which would create the potential for these square surfaces to crash each other and to impede the smooth installation just described.

With the left dropout 32 displaced in direction 103 and the right dropout 34 displaced in direction 105, the frame is flexed slightly as dropouts 32 and 34 are wedged apart and spread relative to each other by distance 88, thus allowing the hub assembly 50 to be inserted between the left dropout 32 and the freehub assembly 20 as illustrated in FIG. 2h. It may be seen in FIG. 2h, the hub assembly 50 is now positioned between the left dropout 32 and freehub assembly, with tips 53 of face teeth 52 are now overlapping and pressing against the guide face 90 of the freehub shell 22. It should be noted that these tips 53 define a circular serrated face. In contrast, guide face 90 constitutes a generally smooth planar face without protrusions and gaps that can otherwise snag and tangle with the opposing face teeth 46 as the hub assembly 50 is assembled to the freehub assembly 20. During installation, as the tips 53 are moved radially past guide face 90, tips 53 tend to skate over this smooth planar face and permit smooth and unobstructed relative movement between the two. The freehub shell 22, with guide face 90, serves to provide shielding geometry in the form of a guide ring to circumferentially surround and shield the face teeth 46. As such, the freehub shell 22, with guide face 90 may be considered to be shielding geometry to facilitate the smooth installation of the hub assembly 50. Conversely, if the freehub shell 22 and guide face 90 were not present to shield face teeth 46, then face teeth 46 would be axially proud and exposed such that, when face teeth 52 are moved past as described, face teeth 52 could potentially snag and tangle with face teeth 46 thereby impeding the smooth installation of the hub assembly 50.

As shown in FIG. 2*i*, the hub assembly 50 is now further advanced in direction 86 toward its installation between the left dropout 32 and freehub assembly 20, with end face 72 of the spacer sleeve 58 now overlapping and pressing against tips 98 of face teeth 46 of the torque shell 24. It should be noted that these tips 98 define a circular serrated face and the end face 72 constitutes a generally smooth planar face. During installation, as the end face 72 is moved radially past tips 98, they tend to skate across this smooth planar face and permit smooth and unobstructed relative movement between the two. Thus, end face 72 may be utilized as a guide face in a similar manner as guide face 90. Also, it is noted that spacer sleeve 58 and end face 72 serve to provide shielding geometry in the form of a circumferential guide ring that is radially inboard of the face teeth 52. Further, as the smooth planar end face 72 is moved radially past smooth planar guide face 90, these two smooth surfaces slide easily past each other as well, further facilitating the smooth and unobstructed relative movement between the two. The spacer sleeve 58, with end face 72, also serves to axially overlap and shield the face teeth 52. As such, the spacer sleeve 58, with end face 72 may be considered to be shielding geometry to facilitate the smooth installation of the hub assembly 50 in a function similar to freehub shell 20 and guide face 90.

As shown in FIG. 2*j*, the hub assembly 50 is now further advanced in direction 86 toward its installation between the left dropout 32 and freehub assembly 20. It may be seen that edge 96 of the spacer sleeve 58 is now contacting the bevels 51 of face teeth 46. Also, and the hub assembly 50 has been guided to ramp against bevels 51 such that it is now axially displaced slightly in direction 105 and face teeth 52 are now positioned to provide an initial axial overlap with face teeth 46. It should be noted that edge 96 is a continuous circular smooth edge that may easily skate along bevels 51. Similarly, edge 97 is a continuous circular smooth edge that may easily skate across bevels 29 and chamfer 27.

As the elastic flex of the frame serves as a spring to induce the dropouts to restore their original axial spacing distance 84, the left dropout 32 is pressing against face 63, which serves to press the hub assembly 50 axially against the freehub assembly 20. Thus, edge 96 is pressed against bevels 51, which causes the edge 96 to be ramped and guided by bevels 51. In other words, the ramped bevels 51 serve to provide self-piloting geometry to radially align, guide, and center the spacer sleeve 58 relative to the freehub assembly 20.

As shown in FIGS. 2*k-m*, which corresponds to FIG. 2*c*, the hub assembly 50 is now fully advanced in direction 86 toward its installation position between the left dropout 32 and freehub assembly 20, such that the axial axis 21 of the hub assembly 50 is collinear with the axial axis 28 of the hub assembly 20. The hub assembly 50 is moved further in direction 105 such that end face 72 is now aligned and butted against left face 36. Also, the central bore 68 of the spacer sleeve 58 is now generally aligned and collinear with the receiver bore 40 of the freehub axle 26. Also, face teeth 46 are now circumferentially nested between face teeth 52 and have full axial overlapping engagement with each other. Simultaneously, as illustrated in FIGS. 2L-*m*, the stub end 75 of the spacer sleeve 58 is fully nested and seated within the slot 31 of the left dropout 32, while face 63 is also flush with the inside face 37*a*.

Next, the control shaft 60 is manually axially urged in the direction 77 via handle 64. The detent balls 80 are ramped out of groove 69 and move radially outboard within radial holes 74 and stretching circumferentially wrapped spring 78. With the detent balls no longer restraining the control shaft 60, the compression spring 71 then serves to push and shuttle the control shaft 60 in direction 77 such that external threads 44 and pilot portion 89 enter the receiver bore 40 of the freehub axle 26. It should be noted that tapered end, chamfer 41, and chamfer 107 all serve to provide a tapered and ramped self-piloting lead-in geometry so that the control shaft 60 will be progressively radially aligned, guided, and centered relative to the freehub axle 26 as it enters the receiver bore 40. It may be seen that this self-piloting geometry provides ease-of-use benefit, since it does not require perfect initial radial alignment between the hub assembly 50 and the freehub assembly 20 during the insertion and assembly process. With pilot portion 89 overlapping and engaging the receiver bore 40, the hub assembly 50 is now in proper radial alignment with the freehub assembly 20 to insure proper mating of face teeth 46 and 52. Next, the control shaft 60 is manually rotated in direction 81 (clockwise, about axial axis 21) via handle 64. This serves to threadably engage the external threads 44 of the control shaft 50 with the internal threads 42 of the freehub axle 26, as shown in FIGS. 2*n-p*. This threaded engagement serves to further draw the control shaft 60 axially in the direction 77 such that the face 65 bears against the outside face 43*a* of the left dropout. As the control shaft 60 is further threadably tightened, the left dropout 32 becomes firmly sandwiched, clamped, and gripped between the face 65 and face 63, thus also providing a limit stop to the axial travel of the control shaft 60. Simultaneously end face 72 is now firmly pressed against left face 36 to create a solid axial stack-up to define the dropout spacing 84. The assembly and installation of the hub assembly 50 is now complete and both the hub assembly 50 and the freehub assembly 20 are now firmly fixed to each other and to the dropouts 32 and 34. Additionally a firm and rigid axial stack-up is achieved for proper fitment between the dropouts 32 and 34 as defined by the axial length between the end face 72 and the face 63 of the hub assembly and the axial length between the left face 36 and right face 45 of the freehub assembly 20. This controlled axial stack-up insures that the face teeth 46 of the torque shell 24 are properly engaged to the face teeth 52 of the coupling ring 25. The axial overlapping engagement between face teeth 46 of the free hub assembly 20 (driving element) and the face teeth 52 of the hub assembly 50 (driven element) now create an effective torque coupling between these two assemblies.

The pilot portion 89 of the control shaft 60 now has an axial overlap 83 with the receiver bore 40 of the freehub assembly 20. This axial overlap 83 provides alignment and a structural connection between the hub assembly 50 and the freehub assembly 20, to support any bending and/or shear forces between the two assemblies. It is particularly advantageous to have axial overlap and a close fit between the outside diameter of the pilot portion 89 and the mating receiver bore 40 and central bore 68 as this closely fit controls alignment and minimizes independent movement or radial free-play between these components.

It is noted that the control shaft 60 serves to axially bind the spacer sleeve 58 and the freehub axle 26, thereby controlling the axial proximity of face teeth 46 and 52 and maintaining their overlying engagement. The control shaft 60 also serves as a structural joiner to axially bind and to radially locate the spacer sleeve 58 relative to the freehub axle 26.

The forgoing describes the insertion or assembly of the hub assembly 50 between the left dropout 32 and the freehub assembly 20. It is should be understood that the removal or disassembly of the hub assembly 50 is the reverse of the process described above. For removal, the control shaft 60 is unscrewed via handle 64 until the external threads 44 are disengaged from the internal threads 42. The handle is then withdrawn in axial direction 76 to retract the control shaft 60 to the detent position as shown in FIGS. 2c, 2f, 2h, and 2i. The hub assembly 50 and its associated wheel may now be uninstalled or removed in the generally radial outboard direction, in a reverse of the procedure described above, to complete the removal process. Ramped lead-in geometry and bevels 51 serve to temporarily wedge the dropouts apart during this removal process to allow the hub assembly to be easily uninstalled and withdrawn from between the left dropout 32 and freehub assembly 20.

The previous description described an arrangement where the dropouts 32 and 34 are elastically spread slightly during insertion and positioning of the hub assembly 50 to accommodate the axial interference necessitated by distance 88. Alternatively, it is also envisioned that the normal (unflexed or "free") dropout spacing 84 may be sized to include this additional axial distance 88. Then, when the external threads 44 of the control shaft 50 are threadably tightened with the internal threads 42 of the freehub axle, face 65 will bear on outside face 43a of the 16 ft dropout 32 and the dropouts 32 and 34 will be axially drawn together, flexing the frame slightly and reducing the normal (unflexed or "free") dropout spacing by distance 88, thus insuring the proper axial stack-up and firm assembly previously described. In any case, since the distance 88 is a generally small dimension, the amount of frame flex discussed herein is within the elastic range of the frame members and does not structurally or dimensionally compromise the frame.

Figure 3:
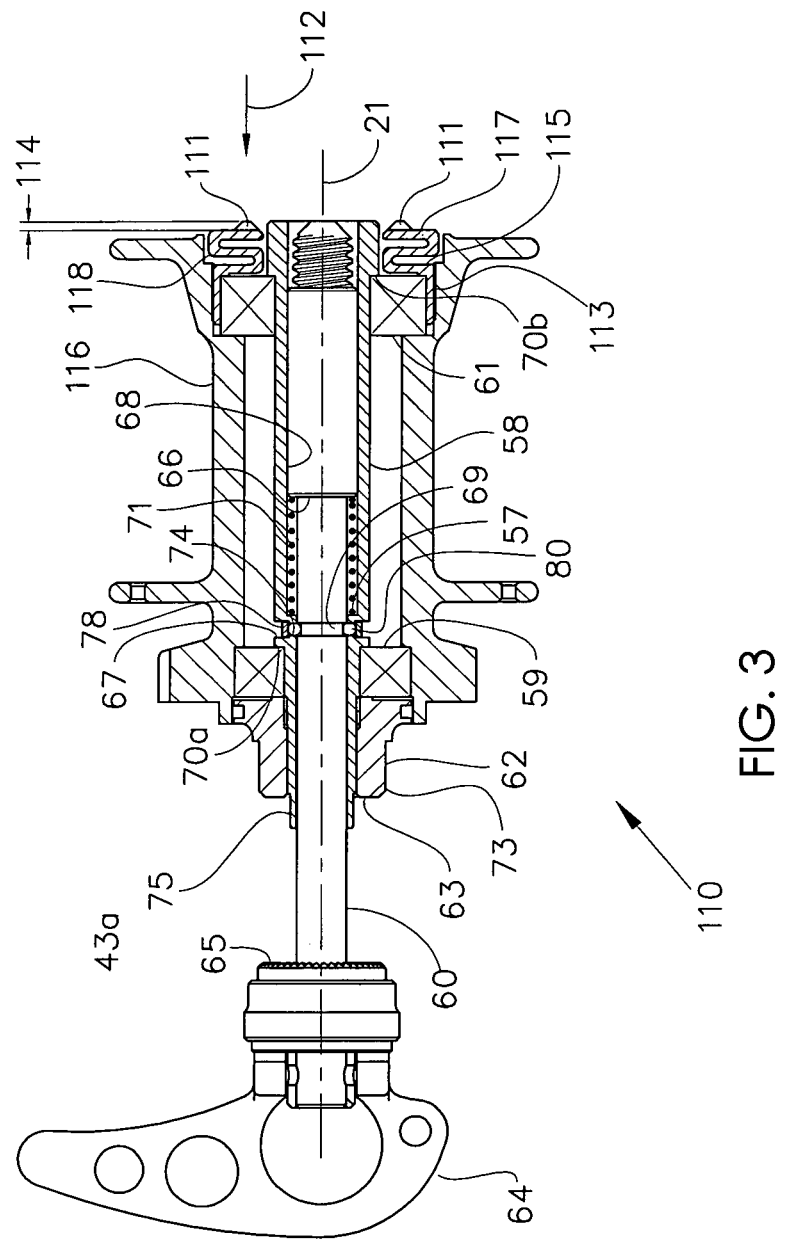
FIG. 3 is an axial cross-sectional view of a second embodiment of the present invention, showing a hub assembly including engagement teeth located in an axial flexure.

In its most generic form, it is understood that the rotationally driven assembly of FIGS. 2a-p consists of at least two basic components: (1) a stationary or rotationally fixed component of fixed axial length (i.e. the spacer sleeve 58) and (2) a rotatable component (i.e. hub shell 54 and coupling ring 25) that rotates around the fixed component about a generally axial axis (i.e. axial axis 21). Similarly, it is understood that the rotationally driving assembly of FIGS. 2a-p consists of at least two basic components: (1) a stationary or rotationally fixed component of fixed axial length (i.e. freehub axle 26) and (2) a rotatable component (i.e. torque shell 24) that rotates around the fixed component about a generally axial axis (i.e. axial axis 28). The rotatable driving and driven components both include axial projections (i.e. face teeth 46 and 52, respectively) that extend axially toward each other to axially overlap each other, thus creating an overlying engagement or torque coupling to transmit torque between these two rotatable elements. These axial projections may be rigidly fixed to their respective rotatable components (as shown in FIGS. 2a-p) or they may be permitted to flex axially (as shown in FIG. 3).

While the embodiment of FIGS. 2a-p shows the control shaft 60 as biased by the compression spring 71 toward the extended position, it is envisioned that the control shaft 60 may alternatively be biased toward the retracted position. Further, while the linear detent system described herein serves to retain the control shaft 60 in the axially retracted position, such a linear detent system may be alternatively employed to retain the control shaft 60 in whatever axial position desired, whether it be the axially extended position, the axially retracted position, or some position in between. Still further, while FIGS. 2a-p show a control shaft that is shuttles within the driven element, it is also envisioned that a control shaft may alternatively be shuttled with the driving element.

The control shaft 60 of FIGS. 2a-p is shown to be retained with its associated driven element (i.e. hub assembly 50). This provides a convenience to the user, since the number of separate parts is minimized. Alternatively, it is envisioned that the control shaft may be separable from the hub assembly 50 such that it may be withdrawn completely from its associated driven element (and/or driving element). For example, the control shaft 60 may be completely withdrawn and separated from the hub assembly 50. In such a case, the left dropout 32 may alternatively include a through-hole instead of the slot 31 shown in the embodiment of FIGS. 2a-p. In a still further alternative, the control shaft may be separated from the hub assembly 50 and instead be retained by its associated dropout 32. Further still, while the threaded engagement between external threads 44 and internal threads 42 serves to axially clamp and impinge the left dropout 32, it is also envisioned that the control shaft may alternatively be designed to only loosely embrace and/or only be radially retained by the dropout, without the sandwiching pressure described in FIGS. 2a-p.

It may be seen that both the spacer sleeve 58, with its associated axle cap 62, and the freehub axle 26 constitute a solid axial stack-up of stationary (non-rotating) components that is axially bound and clamped together by the control shaft 60. This stack-up controls the axial proximity and engagement of the mating face teeth 46 and 52. This is the preferred arrangement. Alternatively, the solid spacer sleeve 58 may be eliminated such that the control shaft axially binds and clamps the rotating components (i.e. the coupling ring 25 and the torque shell 24) against each other. Since the control shaft is a stationary component, this arrangement has the disadvantage of applying large axial (thrust) loads to the bearings 59, 61, and 23. In a still further alternate arrangement, the control shaft may simply serve as a stationary axle that does not apply any axial or clamping force between the driving element and driven element at all. Instead, the control shaft would merely serve as a radial locating element to allow the driving element and/or driven element to support radial loads.

In the arrangement shown here, the driving element (i.e. freehub assembly 20) remains fixed to its mount (i.e. right dropout 34) and it is the driven element (i.e. hub assembly 50) that may be disengaged and de-mounted from the driving element. It is also envisioned that, in an alternate arrangement, the driven element may remain fixed to its mount and the driving element that may be disengaged and de-mounted from the driven element.

In the arrangement shown here, guide face 90 is shown to be generally axially flush with tips 98 of face teeth 46. However it is also envisioned that in an alternative arrangement the guide face may be axially distal from tips 98, such that tips 98 are recessed relative to the guide face 90 to provide more effective shielding of the face teeth 46. Conversely, it is envisioned that in an alternative arrangement the tips 98 may be axially distal from the guide face 90 such that the tips axially protrude from the guide face.

It is noted that the embodiment of FIG. 2a-p shows that the driven hub assembly 50 directly contacts both the frame and the driving freehub assembly. However, it is envisioned that there may alternatively be intermediate components utilized at the interface between the hub assembly and the frame or between the hub assembly and the freehub assembly, such that the hub assembly 50 contacts the intermediate component.

It is noted that the embodiment of FIG. 2a-p shows a threaded engagement between the external threads 44 of the control shaft 60 and the internal threads 42 of the freehub axle 26 to axially connect the control shaft 60 and the freehub axle 26. It is also envisioned that a wide range of alternate engagement interfaces may be substituted for this threaded interface, such as spring-loaded hooking engagement, frictional engagement, retractable ball engagements, among others. In a further alternative, it is also envisioned that the control shaft 60 may simply have a sleeve fit with the freehub axle 26, for radial alignment without a means for axial connection between the two.

It is noted that the control shaft 60 is rotatable and also able to shuttle axially with respect to the hub assembly 50. Meanwhile, the freehub axle 26 is axially and rotatably fixed to the right dropout 34 of the frame. Thus, the moveable control shaft 60 of the hub assembly 50 is operative to selectively engage the freehub assembly 20. Alternatively, the freehub assembly 20 may include a component similar to a control shaft that is operative to selectively engage the hub assembly 50. In a further alternative, both the hub assembly 50 and the freehub assembly 20 may each include a component, similar to a control shaft, which is operative to selectively engage the other. Still further, the control shaft may be rotatably keyed such that it is non-rotatable and may only axially shuttled or else the control shaft may be axially constrained and may only be rotated.

It is noted that the driving assembly (i.e. freehub assembly 20) of FIGS. 2*a-p* includes a second rotatable element (i.e. freehub shell 22), with one-way ratcheting clutch mechanism to provide rotational engagement between the freehub shell 22 and the torque shell 24 in the driving direction of rotation and rotational disengagement or freewheeling in the reverse-driving direction of rotation. It is also envisioned that the driven assembly (i.e. hub assembly 50) may alternatively include a second rotatable element, and may also include a one-way ratcheting clutch mechanism between this second rotatable element and the hub shell 54. In a further alternative arrangement, the second rotatable element may have an alternative coupling arrangement with the driving and/or driven assembly in place of the one-way ratcheting clutch mechanism described herein. Such alternative coupling arrangements may include a gear reduction coupling arrangement, a lost-motion coupling arrangement, a camming arrangement, among others.

In a still further alternative arrangement, it is also envisioned that neither the driving element nor the driven element include a second rotatable element or a one-way clutch. In such a case, the sprockets (not shown) could be rotationally engaged to the hub assembly 50 in both the driving and reverse-driving direction of rotation.

The embodiment of FIGS. 2*a-p* show the face teeth 52 to be rigidly fixed to the outer hub shell 54 in the axial direction, which requires that the frame to flex and the dropout spacing 84 be axially moveable to accommodate the temporary axial interference necessitated by distance 88. Alternatively, it is envisioned that the dropout spacing remain fixed and either the hub assembly or the freehub assembly include provision to axially flex and accommodate this axial interference. An example of such an arrangement is illustrated in hub assembly 110 of FIG. 3, which is identical to hub assembly 50 in many respects. However the face teeth 111 are shown here to be connected to the hub shell 116 via convolutions 118, which serves as a flexure portion to permit face teeth 111 to be axially flexed in direction 112 by distance 114 to accommodate the temporary axial interference described in FIGS. 2*a-p* as distance 88. The control shaft 60, spacer sleeve 58, axlecap 62 and bearings 59 and 61 are all identical to that described in the embodiment of FIG. 2*a-p*. The corresponding freehub assembly and dropouts may be identical to that described in FIGS. 2*a-j*.

The face teeth 111 are mounted to the outer hub shell 116 via a flexure in the form of convolutions 118 as shown to create a torque coupling flexure. Torque shell 113 includes a fixed portion 115 that is rigidly connected to the hub shell 116 and convolutions 118 that are arranged to provide an elastic flexure and face portion 117 that includes face teeth 111. Convolutions 118 serve as a flexure portion that may be axially flexed to collapse slightly to permit face portion 117 to be displaced to an axially proximal position. Face portion 117 serves as a displaceable portion that carries the face teeth 111, which are rigidly joined thereto. These convolutions 118 are rigidly mounted to both the outer hub shell 116 and to the face teeth 111, and serve as an elastically flexible intermediate portion that allows the face teeth 111 to flex axially in the direction 112. Thus, when the hub assembly 110 is substituted for hub assembly 50 in FIGS. 2*a-p* and is radially installed and inserted between the left dropout 32 and the freehub assembly 20, as described in the sequence associated with FIGS. 2*a-p*, the face teeth 111 pass radially against the corresponding face teeth 46 of the freehub assembly 20. The face teeth 111 may now passively retract in direction 112 via flexure of the convolutions 118 to temporarily permit them to easily slip past the face teeth 46 of the freehub assembly 20. Once the hub assembly 110 is positioned in the radially aligned collinear orientation with the freehub assembly 20, corresponding to FIGS. 2*k*-L, the face teeth 111 may spring back by dimension 114 to an axially distal extended position such that the face teeth 111 interlock and overlie with the face teeth 46 of the freehub assembly 20.

In contrast to the arrangement oulined in U.S. Pat. No. 6,374,975, which utilizes a rotationally keyed sliding torque coupling, the face teeth 111 do not require any sliding or telescoping. Instead, motive torque is transmitted from the face teeth 111, through the convolutions 118, and through its fixed connection to the outer hub shell 116. In the embodiment of FIG. 3, the face teeth may be passively displaced in the axial direction. In other words, the axial displacement distance 114 is induced by assembly force alone. In an alternative arrangement, the face teeth 111 may be actively displaced. In other words, the face teeth 111 may be actively manipulated to induce flex of the convolutions 118 in the axial direction, thus manually displacing the face teeth 111. As an example, the control shaft may interact with the face teeth 111 such that when the control shaft is 60 is retracted in direction 112, it engages the face teeth 111, which are thus also retracted in direction 112. When the control shaft 60 is then extended, as described previously in FIG. 2*n*, face teeth 111 are released to extend as well.

FIGS. 4*a-d*, 5*a-b*, 6*a-b*, 7*a-c* and 8*a-c* describe various embodiments of the previously mentioned face teeth in greater detail. While the previously mentioned face teeth are arranged circumferentially on a ring (as shown clearly in FIG. 2*a*) to provide transmission of rotary torque, for explanation purposes the face teeth in these figures are "unrolled" and shown in linear fashion. It is understood that these linear illustrations are easily translatable to the circumferential face teeth applicable to the embodiments described herein.

In general, the face teeth described herein constitute axial projections such that the face teeth of the hub assembly extend axially toward the freehub assembly, with a tip or crest portion axially distal from the hub assembly and a root portion proximal to the hub assembly. Similarly, the face teeth of the freehub assembly extend axially toward the hub assembly, with a tip portion axially distal from the freehub assembly and a root portion proximal to the freehub assembly. The face teeth also include corresponding leading and trailing flank surfaces that extend between the tip portion and the root portion. Torque is transmitted from the freehub assembly to the hub assembly via an overlie engagement between the flanks of the face teeth of the freehub assembly and the face teeth of the hub assembly. Each face tooth includes a leading flank surface and a trailing flank surface, where the leading flank of the freehub shell bears against the opposing leading flank of the hub shell in the driving direction of rotation. Similarly, the trailing flank of the freehub shell bears against the opposing trailing flank of the hub shell in the reverse-driving direction of rotation, which is rotationally opposed to the driving direction.

There are a variety of face tooth engagement relationships envisioned. In a first relationship, the face teeth may transmit torque bi-directionally such that torque is transmitted between the freehub shell and the hub shell in both the driving and reverse-driving directions of rotation. In a second relationship, the face teeth may transmit torque in only the driving direction of rotation, such that the leading flanks engage to transmit driving torque. In the reverse-driving direction, the face teeth may be designed to slip past each other in a freewheeling engagement that does not transmit appreciable torque. In an exemplary arrangement, the mating leading flanks may have blocking overlie engagement in the driving direction to prevent slippage, while the trailing flanks may be inclined such that they cam off of each other in the reverse-driving direction such that the face teeth spread axially apart and become disengaged to slip past each other. In a third relationship, driving torque is transmitted between the freehub shell and the hub shell in the forward-driving direction. In the reverse-driving direction, there may be very low torque demand on the engagement of the face teeth. Such is the case in the embodiment of FIGS. 2a-p where the freehub assembly includes a one-way clutch or ratchet mechanism that permits freewheeling in the reverse-driving direction of rotation. Thus, in the freewheeling direction of rotation, only minimal torque must be transmitted across the face tooth engagement in the reverse-driving direction to keep the mating face teeth in alignment.

Face tooth and corresponding flank geometry may be tailored to effectively transmit the desired torque level. The flank may be a straight axial flank, without circumferential deviation between tip and root. Alternatively, the flank may be an inclined flank to include circumferential deviation between tip and root. For the purposes of nomenclature in the instant specification, an inclined flank is inclined with an angle relative to the axial axis such that it does not have a circumferential undercut between the tip and root, as illustrated in the trailing inclined flanks 122 of FIGS. 4a-d. Conversely, a reverse inclined flank is inclined with an angle relative to the axial axis such that it creates a circumferential undercut or hook between the tip and root, as illustrated in the leading flanks 144 of FIGS. 5a-b. Furthermore, the flank may be a radially extending flank, such as the flank of a spline that extends in a generally radial direction. Alternatively, the flank may be a oblique axial flank that extends in a direction that is radially oblique from the axial axis. Still further, while the face teeth shown herein describe flank geometry that is generally straight and planar, it is envisioned that a wide range of flank surface geometries may be utilized in the present invention, including curved, helical or faceted flank geometry.

Figure 8A:
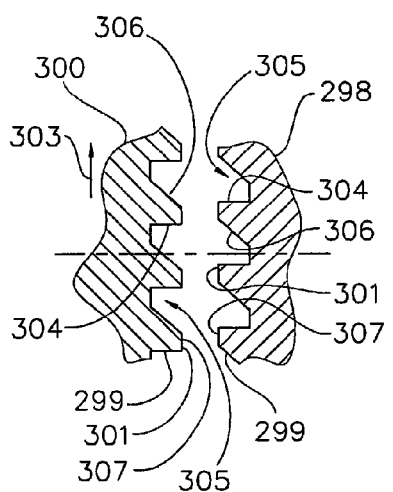
FIGS. 8a-c are cross-sectional views, schematically representing circumferential face teeth as "unrolled" to provide linear representation of the mating engagement teeth of both the driving and driven elements, and illustrating the sequential steps involved in bringing the two elements into rotary engagement, including mating face teeth with flat tooth tips having a planar surface.
Figure 8B:
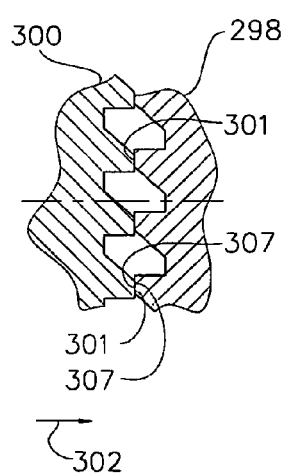
Figure 8C:
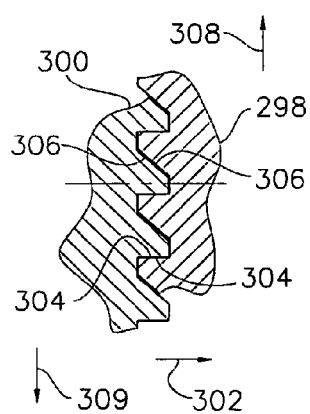

With the exception of FIGS. 8a-c, the face teeth described herein employ tip geometry that is circumferentially pointed or peaked at its axially distal apex, crest or tip, without an appreciable flat region or plateau. This is the preferred geometry since, when the opposing face teeth are introduced to each other, the opposing peaked tips will easily slip past each other to nest adjacent their opposing roots. Thus, the circumferentially pointed tips promote circumferential self-alignment between the face teeth of the driving element and the face teeth of the driven element. While it is envisioned that one may utilize a truncated face tooth where the tip geometry includes a flat region or plateau, in such a case there may exist the possibility that the opposing face teeth may abut tip-to-tip as they are introduced to be engaged, thereby preventing proper nesting and engagement of the face teeth.

Figures 4A, 4B, 4C, 4D:
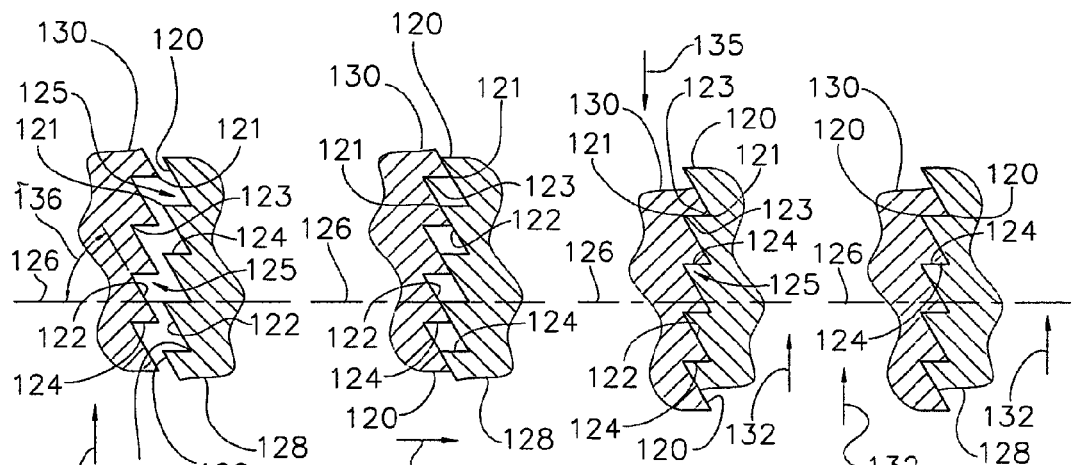
FIGS. 4a-d are cross-sectional views, schematically representing circumferential face teeth as "unrolled" to provide linear representation of the mating engagement teeth of both the driving and driven elements, and illustrating the sequential steps involved in bringing the two elements into rotary engagement, including mating face teeth with blocking engagement in the driving direction.

FIGS. 4a-d describe a driving ring 128 and a driven ring 130, each with a mating complement of face teeth 120 and gaps 125 therebetween. Each face tooth 120 includes an axial distal tip portion 121 and an axial proximal root portion 123, with one axial flank 124 and one inclined flank 122. It is preferable that the axial flank 124 defines a generally axial plane that passes though the axial axis 126. The inclined flanks 122 have an angle of inclination 136 relative to the axial axis 126. FIG. 4a shows the driven ring 130 as assembled radially past the driving ring 128 in direction 131, with the face teeth 120 of the driving ring 128 axially spaced and disengaged relative to the face teeth 120 of the driven ring 130.

Next, FIG. 4b shows the face teeth 120 of the driven ring 130 displaced axially in direction 134 such that the inclined flank 122 of the driven ring 130 contacts the inclined flank 122 of the driving ring 128. As the face teeth 120 of the driven 130 ring are further displaced axially in direction 134, the mating inclined flanks 122 cam against each other, creating a circumferential self-piloting interface to circumferentially align the face teeth 120 of the driving ring 128 and the face teeth 120 of the driven ring 130, in their respective directions 132 and 135.

Next, FIG. 4c shows the face teeth 120 of the driven ring 130 further displaced axially in direction 134 such that the face teeth 120 of the driving ring 128 are fully nested and engaged to the gaps 125 of the driven ring 130, and vice versa. The axial flank 124 of the driving ring 128 now has a circumferentially blocking engagement with the mating axial flank 124 of the driven ring 130. The driving ring 128 may now transmit rotary torque to the driven ring 130 in the rotational direction 132 as shown in FIG. 4d.

It should be noted that, as the driven ring 130 is displaced axially into engagement with the driving ring 128, mating inclined flanks 122 and axial flanks 124 ramp against each other to circumferentially self-align the driving ring 128 and driven ring 130 to achieve the desired overlie engagement between the mating face teeth 120. This preferable circumferential self-alignment feature results in significant ease-of-use advantages by omitting the requirement that the driving ring 128 and driven ring 130 be circumferentially aligned before their respective face teeth 120 may engage each other.

While the axial flanks of FIGS. 4a-d are shown to be axial flanks that project to extend through the axial axis 126, an oblique axial flank (not shown) is alternatively envisioned wherein the axial flank defines a plane, parallel to the axial axis 126, that passes obliquely outside the axial axis. Further, while the face teeth 120 of the driving ring 128 are shown in these figures to be identical to the face teeth 120 of the driven 130 ring, it is also envisioned that a wide range of alternate face tooth profiles are possible, including some that are not identical between the driving ring 128 and the driven 130 ring.

Figures 5A, 5B:
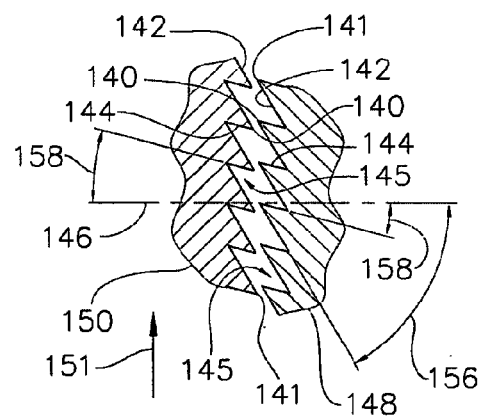
FIGS. 5a-b are cross-sectional views, schematically representing circumferential face teeth as "unrolled" to provide linear representation of the mating engagement teeth of both the driving and driven elements, and illustrating the sequential steps involved in bringing the two elements into rotary engagement, including mating face teeth with self-energizing hooked engagement geometry in the driving direction.

FIGS. 5a-b describe a driving ring 148 and a driven ring 150, each with a mating complement of face teeth 140 and gaps 145 therebetween. Each face tooth 140 includes one inclined trailing flank 142 and one reverse inclined leading flank 144 that meet at tip portion 141. The trailing flank 142 has an angle of inclination 156 relative to the axial axis 146 and the leading flank 144 has an angle of inclination 158 relative to the axial axis 146. FIG. 5a corresponds to the positional alignment described in FIG. 4a and shows the driven ring 150 as assembled radially past the driving ring 148 in direction 151, with the face teeth 140 of the driving ring 148 axially separated and disengaged from the face teeth 140 of the driven ring 150.

Next, as the face teeth 140 of the driven 150 ring are displaced axially in direction 154, the mating inclined flanks 142 press and cam against each other, circumferentially aligning driving ring 148 and driven 150 ring such that the tip portions 141 of the driving ring 148 are fully nested and engaged to the gaps 145 of the driven ring 150, and vice versa, as shown in FIG. 5b.

The leading flank 144 of the driving ring 148 now has a blocking overlie engagement with the mating leading flank 144 of the driven ring 150. The driving ring 148 may now transmit rotary torque to the driven ring 150 in the driving rotational direction 153 as shown in FIG. 5b. In contrast to the axial flank 124 of FIGS. 4a-d, the leading flank 144 of the embodiment of FIGS. 5a-b is inclined in a raked sawtooth profile such that angle of inclination 158 is a reverse incline angle, such that during transmission of driving torque, when mating leading flanks 144 bear against each other, angle of inclination 158 serves to axially ramp and draw the driving ring 148 and driven ring 150 toward each other and to press mating leading flanks 144 into deeper engagement. Thus, this may be considered a self-energizing engagement that insures that the face teeth 140 will not become disengaged under load. In other words, as the driving ring 148 engages the driven ring 150 to transmit torque in the driving direction of rotation 153, the angle of inclination 158 serves to ramp and hook the opposing mating face teeth 140 axially toward each other and press their engagement more intimately. Thus, the angle of inclination 158 aids in preventing potential skipping or disengagement between opposing mating face teeth 140 in the direction 153 of torque transmission.

In general, the term "blocking engagement" refers to tooth engagement geometry such that, as the mating flanks are pressed together to transmit torque, this contact force does not create an appreciable axial force component vector that would induce the mating face teeth to axially separate, thus potentially becoming disengaged. Examples of blocking engagement correspond to the mating axial leading flanks 124 of FIGS. 4a-d and the mating reverse inclined leading flanks 144 of FIGS. 5a-b. A blocking engagement is preferable since the contact forces of torque transmission on the face teeth will not permit the face teeth to slip past each other. The mating reverse inclined face teeth 140 create a further optimized engagement, as the contact forces of torque transmission create an axial force component vector that induces the mating leading flanks 144 to ramp and axially press toward each other. As such, the leading flanks 144 become axially hooked together during driving torque transmission. Alternatively, tooth engagement may be designed to have a non-blocking engagement such that the mating leading flanks are ramped and inclined such that driving torque causes the driving ring and driven ring to wedge and axially separate from each other.

Figures 6A, 6B:
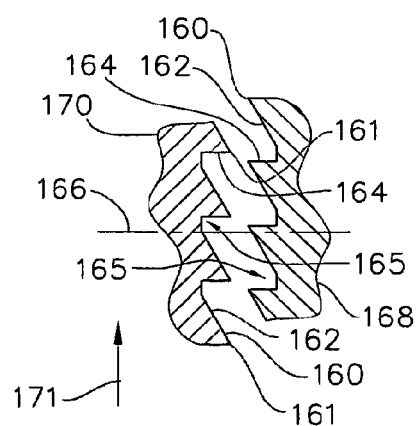
FIGS. 6a-b are cross-sectional views, schematically representing circumferential face teeth as "unrolled" to provide linear representation of the mating engagement teeth of both the driving and driven elements, and illustrating the sequential steps involved in bringing the two elements into rotary engagement, including mating face teeth with relief geometry behind trailing flanks.

FIGS. 6a-b describe a driving ring 168 and a driven ring 170, each with a mating complement of face teeth 160 and gaps 165 therebetween. Similar to the embodiment described in FIGS. 4a-d, each face tooth 160 includes one leading axial flank 164 and one trailing inclined flank 162 that meet at tip portion 161. However, the inclined flanks 162 shown here are relieved slightly. FIG. 6a shows the driven ring 170 as assembled radially past the driving ring 168 in direction 171, with the face teeth 160 of the driving ring 168 axially separated and disengaged from the face teeth 160 of the driven ring 170.

Next, as the face teeth 160 of the driven ring 170 are displaced axially in direction 174, the mating inclined flanks 162 press and cam against each other, circumferentially aligning driving ring 168 and driven 170 ring such that the tip portions 161 of face teeth 160 of the driving ring 168 are fully nested and engaged to the gaps 165 of the driven ring 170, and vice versa, as shown in FIG. 6b.

The axial flank 164 of the driving ring 168 now has a blocking overlie engagement with the mating axial flank 164 of the driven ring 170. The driving ring 168 may now transmit rotary torque to the driven ring 170 in the driving rotational direction 172 as shown in FIG. 6b. Since the inclined flanks 162 are relieved, the blocking engagement of the mating axial flanks 164 in the driving direction or rotation results in a clearance 176 between mating inclined flanks 162 as shown in FIG. 6b. This clearance 176 may be desirable as it provides a reservoir for debris that may otherwise interfere with proper engagement between the mating face teeth 160. It should be noted that, in the reverse-driving direction of rotational, inclined flanks 162 will contact each other and there will be some initial lost rotational motion as the clearance 176 is taken up.

Figure 7A:
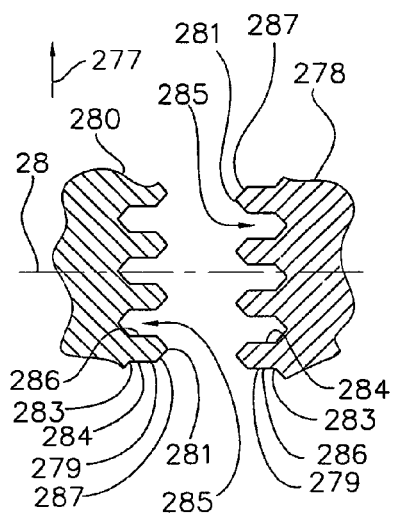
FIGS. 7a-c are cross-sectional views, schematically representing circumferential face teeth as "unrolled" to provide linear representation of the mating engagement teeth of both the driving and driven elements, and illustrating the sequential steps involved in bringing the two elements into rotary engagement, including mating face teeth with blocking engagement between both leading and trailing flanks.
Figure 7B:
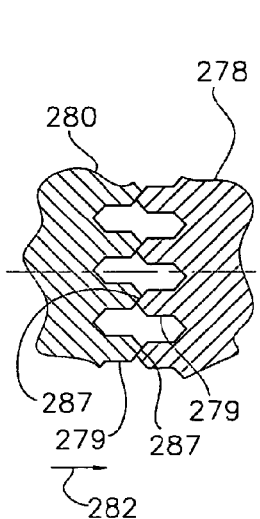
Figure 7C:
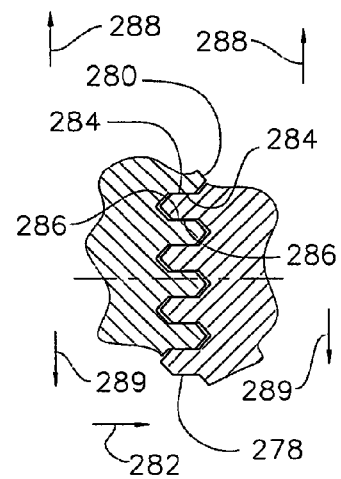

FIGS. 7a-c describe a driving ring 278 and a driven ring 280, each with a mating complement of face teeth 279 and gaps 285 therebetween. Each face tooth 279 includes an axial distal tip portion 281 and an axial proximal root portion 283, with an axial leading flank 284 and an axial trailing flank 286. The tip portion 281 is pointed and includes a peaked transition portion 287 between the pointed tip portion 281 and the leading and trailing flanks 284 and 286. FIG. 7a shows the driven ring 280 as assembled radially past the driving ring 278 in direction 277, with the face teeth 279 of the driving ring 278 axially spaced and disengaged from the face teeth 279 of the driven ring 280.

Next, FIG. 7b shows the face teeth 279 of the driven ring 280 displaced axially in direction 282 such that the peaked transition portion 287 of the driven ring 280 contacts the peaked transition portion 287 of the driving ring 278. As the face teeth 279 of the driven 280 ring are further displaced axially in direction 282, the mating peaked transition portions 287 press and cam against each other, creating a circumferential self-piloting interface to circumferentially align the face teeth 279 of the driving ring 278 and the face teeth 279 of the driven ring 280 as they are assembled toward each other.

Next, the face teeth 279 of the driven 280 ring further displaced axially in direction 282 such that the face teeth 279 of the driving ring 278 are fully nested and engaged to the gaps 285 of the driven ring 280, and vice versa, as shown in FIG. 7c. The axial leading flank 284 of the driving ring 278 now has a circumferentially blocking engagement with the mating axial leading flank 284 of the driven ring 280. The driving ring 278 may now transmit rotary torque to the driven ring 280 in the forward rotational direction 288. It should be noted that the axial trailing flank 286 of the driving ring 278 now also has a circumferentially blocking engagement with the mating axial trailing flank 286 of the driven ring 280. Thus, the driving ring 278 may also transmit rotary torque to the driven ring 280 in the reverse-driving rotational direction 289. Such an arrangement is particularly useful in "fixed gear" applications, where the sprocket (not shown) may be used to drive the hub assembly in both directions of rotation.

It should be noted that the embodiments of FIGS. 4a-d, 5a-b, 6a-b and 7a-c all describe face tooth profiles that have generally pointed or peaked crests or tip portions. When the mating face teeth are axially assembled toward each other, the tips of these peaked face teeth will not stack and hang up on each other, but will instead immediately nest and engage in a circumferentially self-aligning interface. It is envisioned that the face teeth may alternatively include flattened crests where the crest includes a generally radially planar surface. However, this is generally not advisable since, at certain rotational orientations, such a planar surface provides a potential land for the mating crests or tips to stack on each other, rather than nest, and hinder the nesting of the mating crests and roots for proper rotational engagement.

FIGS. 8a-c describe a face tooth profile that has a fattened tip portion. Driving ring 298 and a driven ring 300, each with a mating complement of face teeth 299 and gaps 305 therebetween. Each face tooth 299 includes an axially distal tip portion 301, with a leading axial flank 304 and a trailing inclined flank 306. It is noted that the tip portion 301 is flattened and includes a generally radially planar surface 307. FIG. 8a shows the driven ring 300 as assembled radially past the driving ring 298 in direction 303, with the face teeth 299 of the driving ring 298 axially spaced and disengaged from the face teeth 299 of the driven ring 300.

Next, FIG. 8b shows the face teeth 299 of the driven ring 300 displaced axially in direction 302 such that the tip portion 301 of the driven ring 300 contacts the tip portion 301 of the driving ring 298, with their respective planar surfaces 307 stacked on each other. In contrast to the pointed tips of FIGS. 4a-d, 5a-b, 6a-b and 7a-c, when these planar surfaces 307 are circumferentially aligned such that they contact each other, they may tend to stack or "hang up" as shown, thus impeding the nesting of face teeth 299 with mating gaps 305.

Next, the driven ring 300 must be manually rotated in direction 309 such that its face teeth 299 are circumferentially aligned with gaps 305 of the driving ring 298. This alignment now allows the face teeth 299 of the driven 300 ring to be further displaced axially in direction 302 such that the face teeth 299 of the driving ring 298 are fully nested and engaged to the gaps 305 of the driven ring 280, and vice versa, as shown in FIG. 8c. The axial flank 304 of the driving ring 298 now has a circumferentially blocking engagement with the mating axial flank 304 of the driven ring 300. The driving ring 298 may now transmit rotary torque to the driven ring 300 in the rotational direction 308.

As described in FIGS. 2a-p, it was noted that the radial insertion of the hub assembly 50 between the left dropout 32 and the freehub assembly serves to temporarily axially wedge and spread the dropout spacing 84, with the face teeth 52 moving radially past the left face 36 and face teeth 46 of the freehub assembly 20. Once the hub assembly 50 has reached its aligned installation position, the mating face teeth 52 and 46 are aligned, permitting the hub assembly 50 to shift in direction 79 such that face teeth 52 and 46 become nested, overlapping, engaged and able to transmit torque between the freehub assembly 20 and the hub assembly 50. To study this assembly process more closely, it should be recognized that the hub assembly 50 must move easily in the generally radial direction 86 to fit between the left dropout 32 and the freehub assembly 20 and face teeth 52 and 46 must move radially past each other as they are being pressed together by the residual spring force of the frame. Further, once the hub assembly 50 becomes radially aligned with the freehub assembly 20, the hub assembly 50 must easily engage with the freehub assembly 20.

As a means to provide axial wedging and to also provide a self-aligning lead-in for easy radial insertion of the hub assembly, it is preferable to provide ramped lead-in geometry to the axially outboard components of the hub assembly and to the corresponding axially inboard components of the left dropout 32 and the freehub assembly 20. The goal of this ramped lead-in geometry is twofold: Firstly it is to provide tapered lead-in geometry in place of sharp and/or square edges so that surfaces, such as those adjacent the face teeth, can be easily guided past each other to minimize the possibility that the face teeth will snag each other during assembly. Secondly, as these surfaces are assembled past each other in the generally radial direction, the ramped geometry will serve to axially cam these contacting surfaces into an axially spread orientation, thereby providing the requisite axial space for assembly. Thus, it is preferable to provide a generous chamfer 73 to the axlecap 62 and a generous chamfer 47 to the inside face 37a of the left dropout 32. Also, since the face teeth 52 are proud of the rest of the hub assembly 50 and may possibly tangle and interfere with face teeth 46 as their surfaces are wiped radially past each other, it is preferable to provide a chamfered lead-in to the outer periphery of the mating face teeth 52 and 46 as well. Similarly, it is also preferable to provide lead-in geometry to the portions of the freehub assembly 20 that are adjacent its interface with the hub assembly 50.

The embodiment of FIGS. 9a-d describes one arrangement to provide the aforementioned lead-in geometry at the interface between the hub assembly 180 and the freehub assembly 188. A portion of the components of the hub assembly 180 are shown, including the coupling ring 181 with face teeth 182, ring face 183 and chamfer 211, the spacer sleeve 184 with end face 186, and the control shaft 179. Ring face 183 and end face 186 are shown to be generally axially flush with each other. The roots 202 of face teeth 182 are shown to be generally flush with the ring face 183, with the tips or crests 203 of the face teeth 182 protruding from the ring face by distance 185. The coupling ring 181 rotates about axial axis 21. A portion of the components of the freehub assembly 188 are also shown, including the coupling ring 189 with face teeth 190, chamfer 213 and ring face 192, the freehub axle 191 with end face 193, chamfer 206 and receiver bore 198. The roots 204 of face teeth 190 are shown to be generally flush with the ring face 192, with the crests 205 of the face teeth 190 protruding from the ring face 192 by distance 187 to be generally axially flush with the end face 193. Face teeth 182 include ramped surfaces 194 and 195 adjacent their respective radially inboard and outboard peripheries. Similarly, face teeth 190 include ramped surfaces 196 and 197 adjacent their respective radially inboard and outboard peripheries. Due to the circumferentially discontinuous geometry of the face teeth 182 and 190, the ramped surfaces 194, 195, 196, and 197 are circumferentially discontinuous individual ramped surfaces. In contrast, chamfers 206, 213 and 211 extend in a continuous circumferential ring and may be considered to be circumferentially continuous ramped surfaces. The coupling ring 189 rotates about axial axis 28.

FIG. 9a shows the hub assembly 180 as radially offset from the freehub assembly 188 and axially positioned such that the ring face 183 is axially aligned with the end face 193 prior to insertion and installation. The position described in FIG. 9a corresponds generally to the sequence described in FIG. 2e. FIG. 9b shows the hub assembly 180 as moved radially in direction 199 such that the ramped surface 194 is contacting the ramped surface 196. Next, further radial displacement of the hub assembly 180 in direction 199 will serve to wedge and cam ramped surfaces 194 and 196 against each other, displacing the hub assembly 180 in direction 200, as shown in FIG. 9c, to wedge and spread the dropouts (not shown) so that crests 203 may be axially aligned with crests 205, as shown in FIG. 9c. Simultaneously, the end face 63 of the axlecap (not shown) is now pressed against the inside face 37a of the left dropout 32 to provide axial wedging as previously described in FIGS. 2a-p. Chamfers 211 and 213, that are adjacent ring faces 183 and 192 respectively, also provide ramped guiding to pilot and funnel the hub assembly 180 into axial alignment as it is assembled in direction 199 with the freehub assembly 188. Coupling ring 181 may now be further advanced past coupling ring 189 in direction 199. Thus, it may be seen that ramped surfaces 194 and 196 provide ramped lead-in geometry to facilitate assembly of the hub assembly 180 with the freehub assembly 188 in a generally radial direction 199. FIG. 9d shows the hub assembly 180 further displaced in direction 199, such that axial axis 21 is now collinear with axial axis 28 and the control shaft 179 is now in radial alignment with the receiver bore 198, and face teeth 182 are aligned with face teeth 190, allowing their respective crests 203 and 205 to nest with their opposing roots 202 and 204, thus permitting the hub assembly 180 to move axially in direction 201 to return to its original axial position with end face 186 abutting and contacting end face 193. Note that chamfer 206 provides additional ramped lead-in geometry as face teeth 182 are radially slid past freehub axle 191. It should be noted that, unlike the embodiment of FIGS. 2a-p, which includes shielding geometry that surrounds face teeth 46 and 52, the embodiment of FIGS. 9a-d does not employ such shielding geometry and face teeth 182 do not include a shielding radial face that is axially flush with crests 203. The control shaft 179 may then be extended to engage the receiver bore 198 and freehub axle 191 in the manner previously described in FIGS. 2a-p.

Thus, the embodiment of FIGS. 9a-d describes how the ramped surfaces adjacent the mating face teeth 182 and 190 may provide a self-aligning and wedging lead-in for easy radial insertion of the hub assembly 180. However, roots and crests of the face teeth 182 and 190 still constitute a series of protrusions and gaps and, depending on the pitch and the specific geometry of these face teeth, they may still snag and tangle with each other as the hub assembly 180 is brought into the installation position as previously described. As an aid to overcome the potential for such tangling, the embodiment of FIGS. 10a-d incorporate protective guide rings adjacent the face teeth as described hereinbelow.

As shown in FIGS. 10a-d, hub assembly 180 and its associated components are identical to that described in FIGS. 9a-d. A portion of the components of the freehub assembly 210 is also shown, including the freehub axle 191 with end face 193 and receiver bore 198. Coupling ring 212 rotates about axial axis 28 and includes face teeth 214 with roots 215 and crests 216. The coupling ring 212 also includes an external guide ring 218 that circumferentially surrounds the radially outboard peripheries of the face teeth 214 and an internal guide ring 219 that circumferentially surrounds the radially inboard peripheries of the face teeth 214. The external guide ring 218 and internal guide ring 219 include respective guide faces 220 and 221, which are shown to be generally flush with the crests 216 of face teeth 214. End face 193 and guide faces 220 and 221 are shown to all be generally axially flush with each other. It may be seen that guide rings 218 and 219 provide shielding geometry to face teeth 214. In this respect, guide faces 220 and 221 functionally corresponds to guide face 90 and end face 72 of FIGS. 2a-p respectively. It should be noted that FIGS. 2a-p show guide face 90 and end face 72 belonging to the freehub shell 22 and the spacer sleeve 58 respectively, both of which are discreet components separate from their respective face teeth (46 and 52). Further, both the freehub shell 22 and the spacer sleeve 58 are rotatable relative to their respective face teeth (46 and 52). However, in contrast, the external guide ring 218 and internal guide ring 219 of FIGS. 10a-d are integrally formed in the same component as face teeth 214.

Coupling ring 212 also includes chamfer 222 that circumferentially surrounds the face teeth 214, and chamfer 223, which inscribes the face teeth 214. Both chamfers 222 and 223 provide ramped lead-in geometry adjacent the face teeth 214, which facilitates assembly as described previously. Further, coupling ring 212 also includes circumferential ramped surfaces 207 and 208 adjacent face teeth 214, which serve to provide self-aligning and self-piloting geometry. It should also be noted that the combination of the face teeth 214 and guide rings 218 and 219 serve to create pockets 209, which are bounded by the leading and trailing flanks of the face teeth 214 and the ramped surfaces 207 and 208.

FIG. 10a shows the hub assembly 180 as axially positioned such that the ring face 183 is axially aligned with the end face 193 prior to insertion. FIG. 10b shows the hub assembly 180 as moved radially in direction 199 such that the ramped surface 194 is contacting chamfer 222. Further radial displacement of the hub assembly 180 in direction 199 will serve to wedge and cam ramped surfaces 194 against chamfer 222, displacing the hub assembly 180 in direction 200 as shown in FIG. 10c. Thus, the end face 63 of the axlecap (not shown) is now pressed against the inside face 37a of the left dropout 32, serving to spread the dropout spacing as previously described in FIGS. 2a-p. As the hub assembly 180 is further radially moved in the assembly direction 199 toward its installed position, ramped surfaces 194 and 195 may also cam against respective chamfer 223 and the other edges of the coupling ring 212 and freehub axle 191, further aiding in assembly. Further, as the crests 203 of face teeth 182 are moved radially past guide faces 220 and 221 they tend to skate over these smooth planar faces and permit smooth and unobstructed relative movement between the two, thus facilitating assembly of the hub assembly 180.

FIG. 10d shows the hub assembly 180 further displaced in direction 199, such that axial axis 21 is now collinear with axial axis 28 and the control shaft 179 is now radially aligned with the receiver bore 198 and face teeth 182 are overlapping and engaged with face teeth 214 with their respective crests 203 and 216 nested with their opposing roots 202 and 215 respectively. The hub assembly 180 may now move axially in direction 201 to return to its original axial position with end face 186 flush with end face 193 and end face 183 generally flush with guide faces 2120 and 221. It may also be seen that the male face teeth 182 engage and nest with the female pockets 209.

Further, face teeth 182 each include ramped surfaces 194 and 195 and pockets 209 each include ramped surfaces 207 and 208. As the hub assembly 180 is displaced in direction 201, as described above, ramped surfaces 194 will contact mating ramped surfaces 207 while ramped surfaces 195 will also contact mating ramped surfaces 208, which serves to provide radially centering self-alignment between face teeth 182 and pockets 209. This centering self-alignment provides further ease-of-assembly between the hub assembly 180 and the freehub assembly 210. Also, mating flanks of face teeth 182 and 214 may provide circumferential self-alignment as described in FIGS. 4a-d, while ramped surfaces 194, 207, 195, and 208 provide radial self-alignment between the coupling ring 181 and the coupling ring 212.

It should be understood that an advantage of the embodiment of FIGS. 10a-d is that the guide faces 220 and 221 of the respective guide rings 218 and 221 define a continuous uninterrupted planar ring, without the protrusions and gaps that can snag and tangle with the opposing face teeth 182 as the hub assembly 180 is brought into position as previously described. Thus, as face teeth 182 are radially wiped against the guide ring 222, as shown in the transition between FIG.

10c and FIG. 10d, the crests 203 will simply skate over the broad guide face 220 surface of the guide ring. Thus a further functional improvement is provided.

While my above description contains many specificities, these should not be construed as limitations on the scope of the invention, but rather as exemplifications of embodiments thereof. For example:

The embodiments described herein transmit torque through mating face teeth, which are generally shown here as a circumferential ring of alternating projections and pockets. While the various face teeth profiles described herein are generally the preferred arrangement, a wide range of alternate engagement types may be substituted. One such alternate engagement may consist of axially projecting pegs that mate with corresponding sockets. Another such alternate engagement may include radially extending external splines that mate with radially extending internal spines. Such a radial spline engagement was employed by the aforementioned prior art Cinelli Bivalent design.

The embodiments described herein show the engagement of two circumferential rings of axially extending face teeth that are evenly spaced with identical circumferential pitch. This is preferable since this arrangement permits a multiplicity of circumferential positions where the mating face teeth may engage each other. However, it is also envisioned that these teeth may be arranged with non-identical and or uneven circumferential pitch between the two circumferential rings. Further, it is envisioned that the hub assembly and/or the freehub assembly may employ only a single face tooth and a single leading flank engagement, as this is the minimum required to transmit torque. Still further, the face teeth need not be arranged in a circumferential ring as described herein. Alternatively, the face teeth may be radially or axially staggered or otherwise arranged in a non-circumferential pattern.

While most discussion throughout this disclosure focuses on bi-directional torque coupling, where torque is transmitted from one element to another to drive, or be capable of driving, in both driving and reverse-driving rotation directions, it is also envisioned that such a torque coupling may be configured to transmit torque in only one direction of rotation and allow a freewheeling decoupling of the two members in the opposite direction of rotation. Thus, as shown in FIG. 3, it is feasible to incorporate the one-way clutch mechanism within the torque coupling itself, replacing the clutch mechanism normally located within the freehub body. In this case, the convolutions 118 would serve as a flexure portion and provide elastic spring force to force the mating leading flanks into driving engagement in the driving direction for torque transmission. However, in the reverse driving direction, these convolutions may permit axial movement of the face teeth 111 such that the mating trailing flanks will ramp and cam off of each other to slip past each other for rotational slippage or freewheeling.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

What is claimed is:

1. A torque coupling assembly, comprising:
   a rotationally driving assembly, including a rotationally fixed driving axle element and a rotatable driving shell element with an axial axis of rotation;
   a rotationally driven assembly, including a rotationally fixed driven axle element and a rotatable driven shell element with an axial axis of rotation;
   a frame element, including at least two axially spaced mounting elements for mounting of said driving assembly and said driven assembly;
   wherein said driving shell element includes an associated axial driving projection anchored thereto, including a tip portion located axially distal from said driving shell element and a root portion axially proximal to said driving shell element, and an axially relieved portion circumferentially adjacent said driving projection;
   wherein said driven shell element includes an associated axial driven projection anchored thereto, including a tip portion located axially distal from said driven shell element and a root portion axially proximal to said driven shell element, and an axially relieved portion circumferentially adjacent said driven projection;
   wherein, in an assembled or installed position, said driving assembly and said driven assembly are both connected to said frame and said driving projection is aligned to engage said driven projection with an axial overlie engagement to rotatably transmit torque between said driving shell element and said driven shell element;
   wherein, in a removed or uninstalled position, one of said driving assembly and said driven assembly are disconnected from said frame and displaced in a generally radial direction relative to said frame and to the other of said driving assembly and said driven assembly;
   wherein at least one of said driving assembly and said driven assembly includes ramped lead-in geometry adjacent at least one of said driving projection and said driven projection;
   including a control shaft associated with at least one of said driving assembly and said driven assembly, wherein said control shaft is at least one of axially and rotatably movable relative to the associated one of said driving assembly and said driven assembly;
   wherein said control shaft is axially moveable from an axially distal extended position to an axially proximal retracted position, wherein said control shaft is engaged to the opposing non-associated one of said driving assembly and said driven assembly in said axially distal extended position, and wherein said control shaft is disengaged from the opposing non-associated one of said driving assembly and said driven assembly in said axially proximal retracted position; and
   including a linear detent mechanism to retain said control shaft in at least one of said axially extended position and said axially retracted position.

2. The torque coupling arrangement according to claim 1, wherein in said linear detent mechanism serves to retain said control shaft in said axially retracted position.

3. A torque coupling assembly, comprising:
   a rotationally driving assembly, including a rotationally fixed driving axle element and a rotatable driving shell element with an axial axis of rotation;
   a rotationally driven assembly, including a rotationally fixed driven axle element and a rotatable driven shell element with an axial axis of rotation;
   a frame element, including at least two axially spaced mounting elements for mounting of said driving assembly and said driven assembly;
   wherein said driving shell element includes an associated axial driving projection anchored thereto, including a tip portion located axially distal from said driving shell element and a root portion axially proximal to said driving shell element, an axial distance between said tip portion and said root portion, and an axially relieved portion circumferentially adjacent said driving projection;

wherein said driven shell element includes an associated axial driven projection anchored thereto, including a tip portion located axially distal from said driven shell element and a root portion axially proximal to said driven shell element, an axial distance between said tip portion and said root portion, and an axially relieved portion circumferentially adjacent said driven projection;

wherein, in an assembled or installed position, said driving assembly and said driven assembly are both connected to said frame and said driving projection is aligned to engage said driven projection with an axial overlie engagement to rotatably transmit torque between said driving shell element and said driven shell element;

wherein, in a removed or uninstalled position, one of said driving assembly and said driven assembly are disconnected from said frame and displaced in a generally radial direction relative to said frame and to the other of said driving assembly and said driven assembly;

wherein said driving projection includes a leading flank and a trailing flank between said tip portion and said root portion and wherein said driven projection includes a leading flank and a trailing flank between said tip portion and said root portion such that, in a forward driving direction of rotation, said leading flank of said driving projection bears against said leading flank of said driven projection in an overlie engagement for torque transmission between said driving shell element and said driven shell element, and in a reverse direction of rotation, said trailing flank of said driving projection bears against said trailing flank of said driven projection in an overlie engagement; and wherein at least one of (i) said driving assembly includes shielding geometry radially outboard said driving projection and (ii) said driven assembly includes shielding geometry radially outboard said driven projection, and wherein said shielding geometry extends to axially overlap a substantial portion of said axial distance of the associated one of said driving projection and said driven projection.

4. The torque coupling arrangement according to claim 3, wherein in said uninstalled or removed position, said driving assembly remains axially and radially fixed to said frame and said driven assembly is displaced in a generally radial direction relative to said frame and said driving assembly.

5. A The torque coupling arrangement according to claim 3, wherein in said uninstalled or removed position, said driven assembly remains axially and radially fixed to said frame and said driving assembly is displaced in a generally radial direction relative to said frame and said driven assembly.

6. The torque coupling arrangement according to claim 3, wherein at least one of said driving assembly and said driven assembly includes ramped lead-in geometry axially adjacent the associated one of said driving projection and said driven projection, and wherein said ramped lead-in geometry is radially outboard of the associated one of said driving projection and driven projection and wherein said ramped lead-in geometry transitions from a first region that is axially proximal and radially outboard to a second region that is axially distal and radially inboard from said first region.

7. The torque coupling arrangement according to claim 3, wherein at least one of said driving assembly and said driven assembly includes ramped lead-in geometry axially adjacent the associated one of said driving projection and said driven projection, and wherein said ramped lead-in geometry is radially inboard of an associated one of said driving projection and said driven projection and wherein said ramped lead-in geometry transitions from a first region that is axially proximal and radially inboard to a second region that is axially distal and radially outboard from said first region.

8. The torque coupling arrangement according to claim 3, wherein at least one of said driving assembly and said driven assembly includes ramped lead-in geometry axially adjacent the associated one of said driving projection and said driven projection, and wherein said ramped lead-in geometry includes a ramped surface radially adjacent the associated one of said driving projection and said driven projection.

9. The torque coupling arrangement according to claim 3, wherein at least one of said driving assembly and said driven assembly includes ramped lead-in geometry axially adjacent the associated one of said driving projection and said driven projection, and wherein said ramped lead-in geometry is in a continuous circumferential surface.

10. The torque coupling arrangement according to claim 9, wherein said ramped lead-in geometry is a circumferential chamfer.

11. The torque coupling arrangement according to claim 3, wherein at least one of said driving assembly and said driven assembly includes ramped lead-in geometry axially adjacent the associated one of said driving projection and said driven projection and wherein said ramped lead-in geometry is in a discontinuous circumferential surface.

12. The torque coupling arrangement according to claim 3, wherein at least one of said driving assembly and said driven assembly includes ramped lead-in geometry and wherein said ramped lead-in geometry axially overlaps said axial distance of the associated one of said driving projection and said driven projection.

13. The torque coupling arrangement according to claim 12, wherein said ramped lead-in geometry extends to a region axially proximal relative to the root of the associated one of said driving projection and said driven projection.

14. The torque coupling arrangement according to claim 3, wherein at least one of said driving assembly and said driven assembly includes ramped lead-in geometry and wherein said ramped lead-in geometry is in the associated one of said driving projection and said driven projection.

15. The torque coupling arrangement according to claim 3, wherein at least one of said driving assembly and said driven assembly includes ramped lead-in geometry axially adjacent the associated one of said driving projection and said driven projection and wherein said ramped lead-in geometry serves to axially wedge and spread apart said at least two axially spaced mounting elements of said frame during the transition from said uninstalled position to said installed position.

16. The torque coupling arrangement according to claim 3, wherein at least one of said driving assembly and said driven assembly includes ramped lead-in geometry adjacent an interface between said frame and the associated one of said driving assembly and said driven assembly.

17. The torque coupling arrangement according to claim 3, wherein at least one of said driving assembly and said driven assembly includes ramped lead-in geometry and wherein said ramped lead-in geometry is axially adjacent an interface between said driving assembly and said driven assembly.

18. The torque coupling arrangement according to claim 3, wherein at least one of said driving projection and driven projection includes a ramped surface that interfaces with the opposing non-associated one of said driving shell element and said driven shell element to provide radial centering self-alignment between said driving shell element and said driven shell element during the transition between said uninstalled position and said installed position.

19. The torque coupling arrangement according to claim 18, wherein said ramped surface is adjacent the associated one of said driving projection and said driven projection.

20. The torque coupling arrangement according to claim 3, wherein at least one of said driving assembly and said driven assembly includes ramped lead-in geometry axially adjacent the associated one of said driving projection and said driven projection and wherein said ramped lead-in geometry is in a discreet component separate from the associated one of said driving projection and said driven projection.

21. The torque coupling arrangement according to claim 3, including a control shaft associated with one of said driving assembly and said driven assembly, wherein said control shaft is at least one of axially and rotatably movable relative to the associated one of said driving assembly and said driven assembly.

22. The torque coupling arrangement according to claim 21, wherein said control shaft serves to radially align said driving axle element to said driven axle element.

23. The torque coupling arrangement according to claim 21, wherein said control shaft is axially moveable from an axially distal extended position to an axially proximal retracted position, wherein said control shaft is engaged to the opposing non-associated one of said driving assembly and said driven assembly in said axially distal extended position, and wherein said control shaft is disengaged from the opposing non-associated one of said driving assembly and said driven assembly in said axially proximal retracted position.

24. The torque coupling arrangement according to claim 23, including a means to bias said control shaft toward one of said axially extended position and said axially retracted position.

25. The torque coupling arrangement according to claim 24, wherein said means to bias serves to bias said control shaft toward said axially extended position.

26. The torque coupling arrangement according to claim 24, wherein said means to bias is a spring.

27. The torque coupling arrangement according to claim 21, wherein said control shaft includes an unthreaded pilot portion, and wherein the corresponding opposing non-associated one of said driving axle element and driven axle element includes a receiver hole to receive said control shaft, including axial overlap between said receiver hole and said pilot portion.

28. The torque coupling arrangement according to claim 27, wherein at least one of said control shaft and said receiver hole includes tapered lead-in geometry for self-piloting between said control shaft and said receiver hole.

29. The torque coupling arrangement according to claim 21, including a threaded engagement between said control shaft and the non-associated one of said driving element and said driven element and wherein said threaded engagement serves to axially bind said driving assembly to said driven assembly.

30. The torque coupling arrangement according to claim 21, wherein said control shaft serves to axially clamp the associated one of said driving assembly and said driven assembly to said frame.

31. The torque coupling arrangement according to claim 21, wherein said control shaft is axially and radially retained to the associated one of said driving assembly and said driven assembly.

32. The torque coupling arrangement according to claim 3, wherein said driving axle element and said driven axle element each have a fixed axial length between an associated first end face and an associated second end face, and wherein said driving axle element abuts said frame element at said associated first end face and abuts said driven axle element at said associated second end face, and wherein said driven axle element abuts said frame element at said associated first end face and abuts said driving axle element at said associated second end face.

33. The torque coupling arrangement according to claim 3, wherein said torque may be transmitted between said driving assembly and said driven assembly bi-directionally in both the forward driving direction of rotation and the reverse direction of rotation.

34. The torque coupling arrangement according to claim 3, wherein at least one of said driving assembly and said driven assembly includes a one-way clutch mechanism, wherein said torque may be transmitted between said driving assembly and said driven assembly only in the forward driving direction of rotation and freewheeling without torque transmission in the reverse direction of rotation.

35. The torque coupling arrangement according to claim 3, wherein said leading flank is an axial flank.

36. The torque coupling arrangement according to claim 3, wherein said leading flank is an inclined flank.

37. The torque coupling arrangement according to claim 3, wherein said leading flank is a reverse inclined flank to provide a hooked and self energizing engagement that serves to axially draw said driving shell element and said driven shell element toward each other in the driving direction of rotation.

38. The torque coupling arrangement according to claim 3, wherein said trailing flank is an inclined flank.

39. The torque coupling arrangement according to claim 3, wherein said trailing flank is an axial flank.

40. The torque coupling arrangement according to claim 3, wherein, in said forward driving direction of rotation, there exists a relieved gap between said trailing flank of said driving projection and said trailing flank of said driven projection.

41. The torque coupling arrangement according to claim 3, wherein said tip portion is a generally circumferentially pointed tip portion.

42. The torque coupling arrangement according to claim 3, wherein said tip portion is flattened to include a generally planar surface.

43. The torque coupling arrangement according to claim 42, wherein said shielding geometry constitutes a circumferential guide ring that circumferentially circumscribes the associated one of said driving projection and said driven projection.

44. The torque coupling arrangement according to claim 42, wherein said shielding geometry is one of monolithic and integral with the associated one of said driving projection and said driven projection.

45. The torque coupling arrangement according to claim 42, wherein said shielding geometry is in a component that also includes ramped lead-in geometry that axially overlaps said axial distance of the associated one of said driving projection and said driven projection.

46. The torque coupling arrangement according to claim 42, wherein said shielding geometry is in a discreet component distinct from the associated one of said driving projection and said driven projection.

47. The torque coupling arrangement according to claim 46, wherein at least one of (i) said shielding geometry is rotatable relative to the associated one of said driving projection and said driven projection about said axial axis and (ii) the associated one of said driving projection and said driven projection is rotatable relative to said shielding geometry about said axial axis.

48. The torque coupling arrangement according to claim 47, wherein said shielding geometry that circumferentially circumscribes the associated one of said driving projection and said driven projection.

49. The torque coupling arrangement according to claim 47, wherein said shielding geometry is in a component that also includes ramped lead-in geometry that axially overlaps said axial distance of the associated one of said driving projection and said driven projection.

50. The torque coupling assembly according to claim 3, wherein said shielding geometry of said one of said driving element and said driven element has a circumferential width, and wherein said relieved portion of the opposing non-associated one of said driving projection and said driven projection has a circumferential relief width as measured at a location axially coincident with the opposing non-associated tip portion, and wherein said circumferential width of said shielding geometry is greater than said circumferential relief width.

51. The torque coupling arrangement according to claim 50, wherein said shielding geometry includes a generally circumferential guide face axially distal from said root of the associated one of said driving projection and said driven projection, and wherein said guide face is generally axially coincident and flush with said tip of said axial projection.

52. The torque coupling arrangement according to claim 50, wherein said shielding geometry includes a generally circumferential guide face axially distal from said root of the associated one of said driving projection and said driven projection, and wherein said tip of the associated one of said driving projection and said driven projection is axially proximal and recessed from said guide face.

53. The torque coupling arrangement according to claim 50, wherein said shielding geometry includes a generally circumferential guide face axially distal from said root of the associated one of said driving projection and said driven projection, and wherein said tip of the associated one of said driving projection and said driven projection is axially distal and protruding from said guide face.

54. The torque coupling arrangement according to claim 3, wherein said shielding geometry is immediately radially outboard the associated one of said driving projection and said driven projection.

55. The torque coupling arrangement according to claim 3, wherein at least one of (i) said driving assembly includes inboard shielding geometry located radially inboard of said driving projection and (ii) said driven assembly includes inboard shielding geometry located radially inboard of said driven projection, and wherein said inboard shielding geometry extends to axially overlap a portion of said axial distance of the associated one of said driving projection and said driven projection.

56. The torque coupling arrangement according to claim 55, wherein said tip of the associated one of said driving projection and said driven projection is one of axially flush and axially proximal and recessed from said inboard shielding geometry.

57. The torque coupling arrangement according to claim 55, wherein at least one of (i) said inboard shielding geometry is rotatable relative to the associated one of said driving projection and said driven projection about said axial axis and (ii) the associated one of said driving projection and said driven projection is rotatable relative to said inboard shielding geometry about said axial axis.

58. The torque coupling arrangement according to claim 3, wherein at least one of said driving shell and said driven shell includes face teeth comprising a multiplicity of the associated one said driving projections and said driven projections arranged circumferentially about said axial axis, and a multiplicity of relieved portions circumferentially adjacent the associated one said driving projections and driven projections, and wherein said tip portions of said face teeth are generally axially coincident, and wherein said tip portions of said face teeth have a circumferential width narrower said root portions of said face teeth.

59. The torque coupling arrangement according to claim 58, wherein said tip portions are generally circumferentially pointed tip portions.

60. A torque coupling assembly, comprising:
  a rotationally driving assembly, including a rotationally fixed driving axle element and a rotatable driving shell element with an axial axis of rotation;
  a rotationally driven assembly, including a rotationally fixed driven axle element and a rotatable driven shell element with an axial axis of rotation;
  a frame element, including at least two axially spaced mounting elements for mounting of said driving assembly and said driven assembly;
  wherein said driving shell element includes an associated axial driving projection anchored thereto, including a tip portion located axially distal from said driving shell element and a root portion axially proximal to said driving shell element, and an axially relieved portion circumferentially adjacent said driving projection;
  wherein said driven shell element includes an associated axial driven projection anchored thereto, including a tip portion located axially distal from said driven shell element and a root portion axially proximal to said driven shell element, and an axially relieved portion circumferentially adjacent said driven projection;
  wherein, in an assembled or installed position, said driving assembly and said driven assembly are both connected to said frame and said driving projection is aligned to engage said driven projection with an axial overlie engagement to rotatably transmit torque between said driving shell element and said driven shell element;
  wherein, in a removed or uninstalled position, one of said driving assembly and said driven assembly are disconnected from said frame and displaced in a generally radial direction relative to said frame and to the other of said driving assembly and said driven assembly;
  wherein at least one of said driving assembly and said driven assembly includes ramped lead-in geometry adjacent at least one of said driving projection and said driven projection; and
  wherein at least one of said driving shell element and said driven shell element includes a coupling flexure, wherein said coupling flexure includes: (i) a fixed portion that is generally axially fixed to an associated one of said driving shell element and said driven shell element; (ii) a displaceable portion that includes the associated one of said driving projection and said driven projection, wherein said displaceable portion may be axially displaced relative to said fixed portion via a flexure portion; and (iii) said flexure portion that may be axially flexed and is located between said fixed portion and said displaceable portion.

61. The torque coupling arrangement according to claim 60, wherein said displaceable portion has an axially extended position that is axially distal from the associated one of said driving assembly and said driven assembly and an axially retracted position that is axially proximal to the associated one of said driving assembly and said driven assembly relative to said axially extended position, and wherein said driving projection is engaged to said driven projection in said axially extended position and wherein said axial projection of said driving shell element may be disengaged from said axial projection of said driven shell element in said axially retracted position.

62. The torque coupling arrangement according to claim 60, wherein said driving projection includes a leading flank and a trailing flank between said tip portion and said root portion and wherein said driven projection includes a leading flank and a trailing flank between said tip portion and said root portion such that, in the forward driving direction of rotation, said leading flank of said driving projection bears against said leading flank of said driven projection in said overlie engagement for said torque transmission between said driving shell element and said driven shell element; and in the reverse driving direction of rotation, said trailing flank of said driving projection cams against and slips past said trailing flank of said driven projection in a freewheeling engagement between said driving shell element and said driven shell element.

63. The torque coupling arrangement according to claim 60, wherein said displaceable portion may be passively displaced.

64. The torque coupling arrangement according to claim 60, wherein said displaceable portion may be actively displaced.

65. The torque coupling arrangement according to claim 60, wherein said driving projection includes a leading flank and a trailing flank between said tip portion and said root portion and wherein said driven projection includes a leading flank and a trailing flank between said tip portion and said root portion such that, in a forward driving direction of rotation, said leading flank of said driving projection bears against said leading flank of said driven projection in said overlie engagement for torque transmission between said driving shell element and said driven shell element, and in a reverse direction of rotation, said trailing flank of said driving projection bears against said trailing flank of said driven projection in an overlie engagement for torque transmission between said driving shell element and said driven shell element.

* * * * *